United States Patent
Herre et al.

(10) Patent No.: US 9,089,864 B2
(45) Date of Patent: Jul. 28, 2015

(54) PAINTING ROBOT AND ASSOCIATED OPERATING METHOD

(75) Inventors: Frank Herre, Oberriexingen (DE); Manfred Michelfelder, Steinheim (DE); Markus Erhardt, Stuttgart (DE); Michael Baumann, Flein (DE); Rainer Melcher, Oberstenfeld (DE); Thomas Buck, Sachsenheim (DE)

(73) Assignee: Durr Systems, GmbH, Bietigheim-Bissingen (DE)

( * ) Notice: Subject to any disclaimer, the term of this patent is extended or adjusted under 35 U.S.C. 154(b) by 844 days.

(21) Appl. No.: 12/933,536

(22) PCT Filed: Mar. 6, 2009

(86) PCT No.: PCT/EP2009/001641
§ 371 (c)(1),
(2), (4) Date: Sep. 20, 2010

(87) PCT Pub. No.: WO2009/115201
PCT Pub. Date: Sep. 24, 2009

(65) Prior Publication Data
US 2011/0014371 A1    Jan. 20, 2011

(30) Foreign Application Priority Data

Mar. 20, 2008  (DE) .................... 10 2008 015 258
Mar. 25, 2008  (DE) .................... 10 2008 015 494
Aug. 8, 2008   (DE) .................... 10 2008 037 035

(51) Int. Cl.
*B05B 13/04*   (2006.01)
*B05B 12/14*   (2006.01)
*B25J 11/00*   (2006.01)
*B05C 7/00*    (2006.01)

(52) U.S. Cl.
CPC ............ *B05B 13/0431* (2013.01); *B05B 12/149* (2013.01); *B05B 12/1418* (2013.01); *B25J 11/00* (2013.01); *B05B 12/1481* (2013.01); *B05B 13/0452* (2013.01); *B05C 7/00* (2013.01)

(58) Field of Classification Search
None
See application file for complete search history.

(56) References Cited

U.S. PATENT DOCUMENTS

| | | | | |
|---|---|---|---|---|
| 3,674,207 A * | 7/1972 | Carbonetti et al. | ............ | 239/69 |
| 4,019,653 A * | 4/1977 | Scherer et al. | .................... | 222/1 |
| 4,539,932 A * | 9/1985 | Vecellio | ........................ | 118/697 |
| 4,864,966 A * | 9/1989 | Anderson et al. | ............. | 427/265 |
| 5,288,525 A * | 2/1994 | Diana | .......................... | 427/475 |

(Continued)

FOREIGN PATENT DOCUMENTS

| CN | 1371308 A | 9/2002 |
|---|---|---|
| CN | 1441706 A | 9/2003 |

(Continued)

OTHER PUBLICATIONS

Russian Decision to Grant (May 28, 2013).

(Continued)

*Primary Examiner* — Charles Capozzi
(74) *Attorney, Agent, or Firm* — Bejin Bieneman PLC

(57) ABSTRACT

An exemplary painting robot and corresponding operating methods for the same are disclosed. The robot may be configured to paint motor vehicle bodies on an outer surface and an inner surface with an atomizer that is guided by the painting robot. According to the exemplary illustrations, the painting robot is suitable for painting the outer surfaces and for painting the inner surfaces of the motor vehicle bodies.

30 Claims, 40 Drawing Sheets

(56) References Cited

U.S. PATENT DOCUMENTS

| | | | |
|---|---|---|---|
| 6,702,893 B2 | 3/2004 | Thome et al. | |
| 6,712,285 B2 | 3/2004 | Provenaz et al. | |
| 6,755,913 B1 | 6/2004 | Kobayashi et al. | |
| 6,945,483 B2 * | 9/2005 | Clifford et al. | 239/690.1 |
| 7,399,363 B2 * | 7/2008 | Clifford et al. | 118/323 |
| 7,638,000 B2 * | 12/2009 | Clifford et al. | 118/323 |
| 8,051,796 B2 * | 11/2011 | Clifford | 118/323 |
| 8,689,730 B2 * | 4/2014 | Clifford | 118/629 |
| 2004/0060510 A1 * | 4/2004 | Ciarelli et al. | 118/308 |
| 2004/0115360 A1 | 6/2004 | Clifford et al. | |
| 2005/0029370 A1 * | 2/2005 | Giulano | 239/569 |
| 2005/0173018 A1 * | 8/2005 | Herre et al. | 141/91 |
| 2007/0082143 A1 * | 4/2007 | Baumann et al. | 427/458 |

FOREIGN PATENT DOCUMENTS

| | | |
|---|---|---|
| DE | 19742588 A1 | 4/1999 |
| DE | 19846073 A1 | 4/2000 |
| DE | 19937474 A1 | 3/2001 |
| DE | 19962220 A1 | 7/2001 |
| DE | 10125648 A1 | 11/2002 |
| DE | 20118531 U1 | 1/2003 |
| DE | 10310775 A1 | 9/2004 |
| DE | 103 35 358 A1 | 3/2005 |
| DE | 60111607 | 4/2006 |
| DE | 102005036767 A1 | 2/2007 |
| DE | 102006005341 A1 | 8/2007 |
| DE | 102007037663 A1 | 2/2009 |
| DE | 102008047118 A1 | 4/2010 |
| EP | 1 114 677 A1 | 7/2001 |
| EP | 1245295 A2 | 10/2002 |
| EP | 1250964 A2 | 10/2002 |
| EP | 1362641 A1 | 11/2003 |
| EP | 1362642 A1 | 11/2003 |
| EP | 1207964 B1 | 11/2004 |
| EP | 1522348 A2 | 4/2005 |
| EP | 980291 B1 | 8/2005 |
| EP | 1609532 A1 | 12/2005 |
| EP | 1614480 A1 | 1/2006 |
| EP | 1702687 A1 | 9/2006 |
| JP | 2000233142 | 8/2000 |
| JP | 20010079463 | 3/2001 |
| JP | 2002113400 A | 4/2002 |
| JP | 200769133 A | 3/2007 |
| JP | 2007152300 | 6/2007 |
| SU | 1053892 A | 11/1983 |
| SU | 1269850 A1 | 11/1986 |
| SU | 1273179 A1 | 11/1986 |
| WO | WO-2005046880 A2 | 5/2005 |
| WO | WO-2008071273 A2 | 6/2008 |

OTHER PUBLICATIONS

International Search Report PCT/EP2009/001641.

* cited by examiner

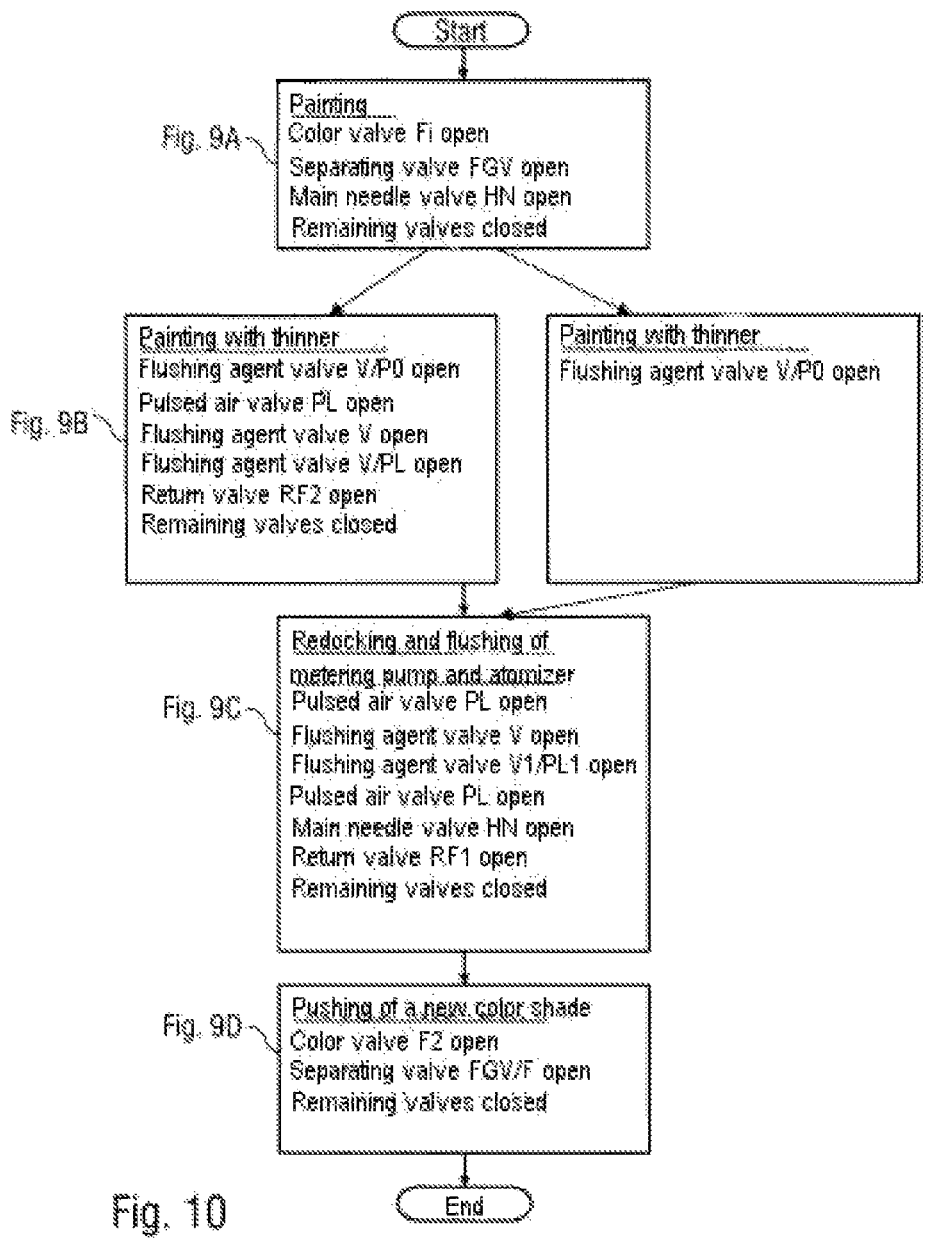

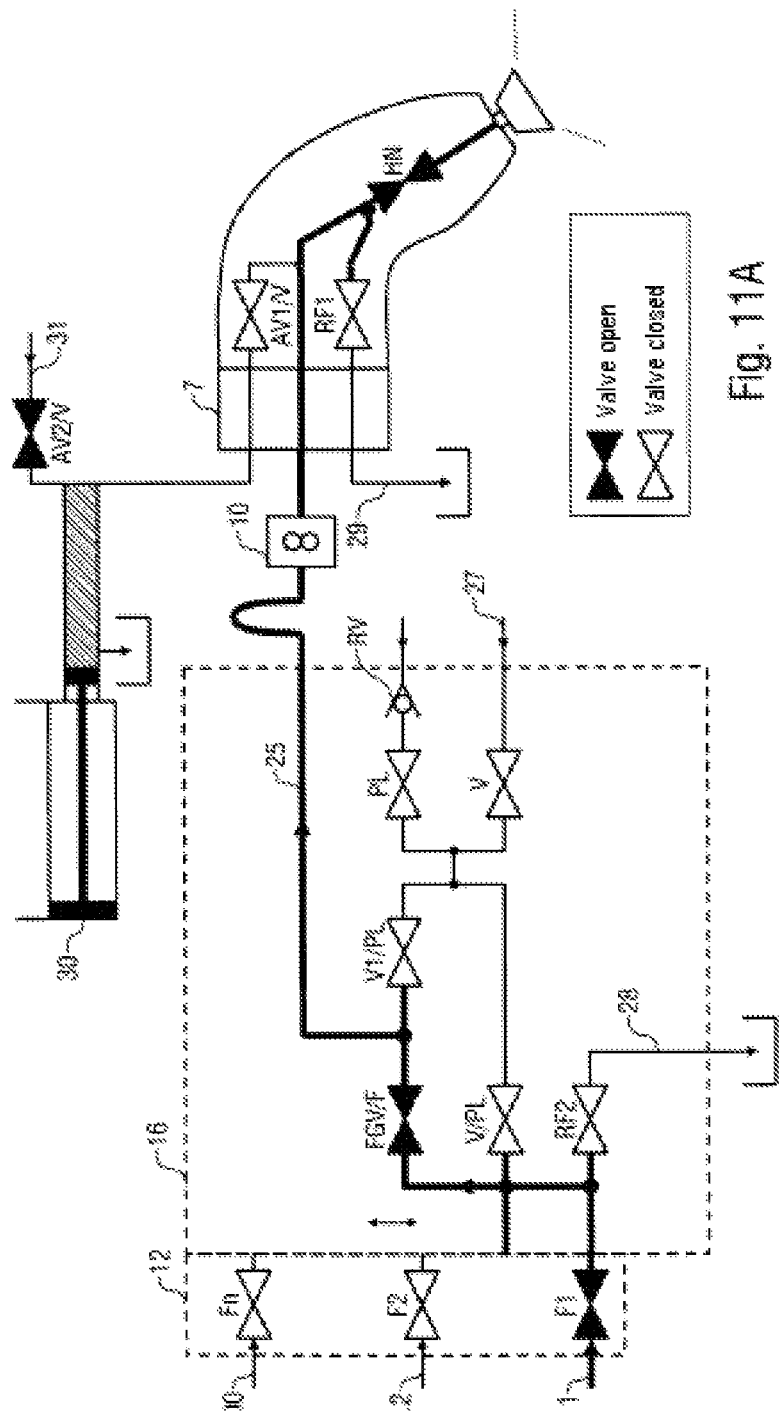

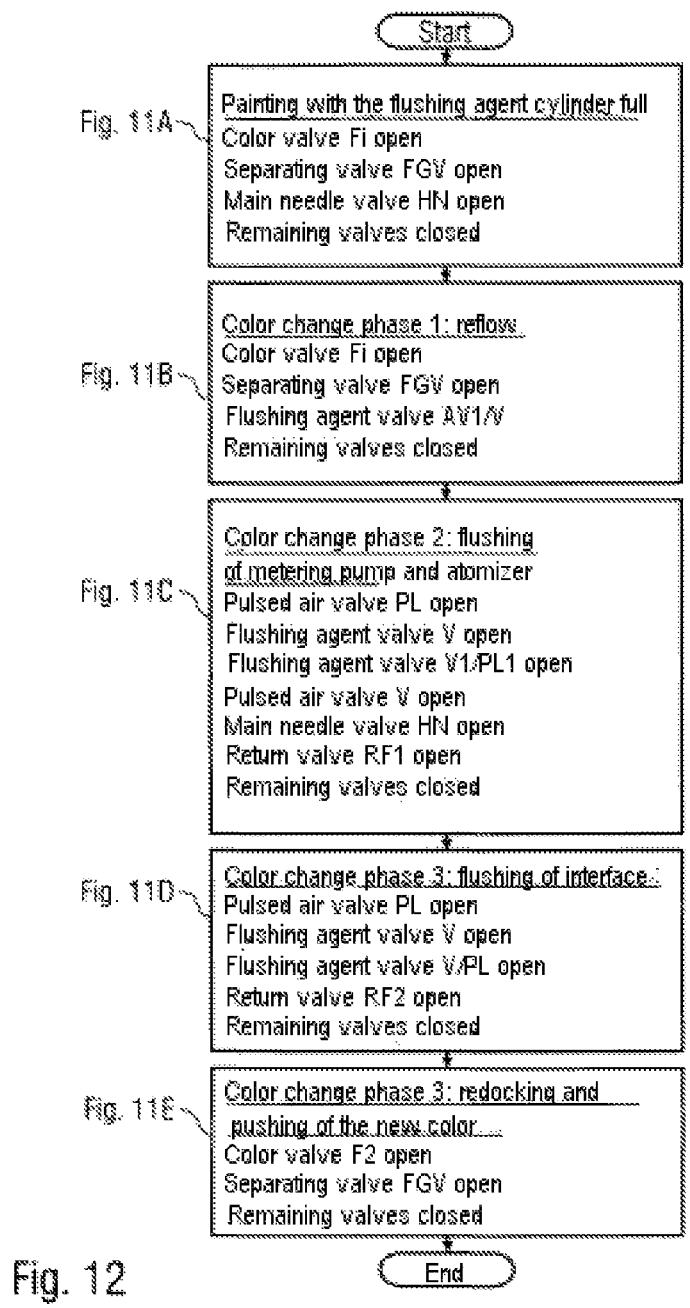

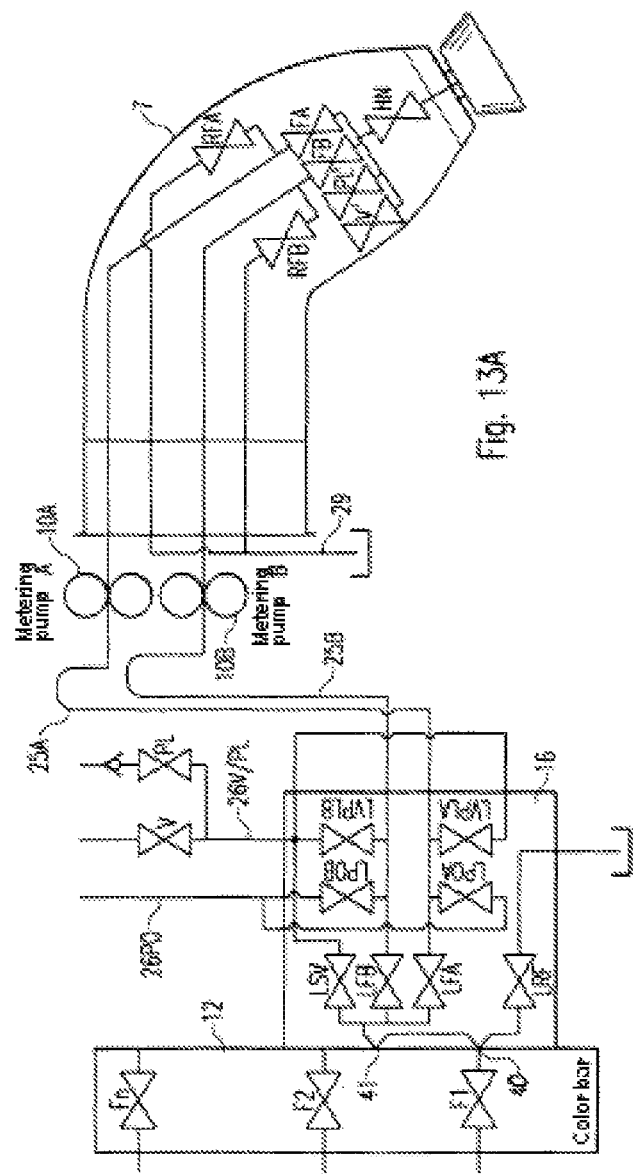

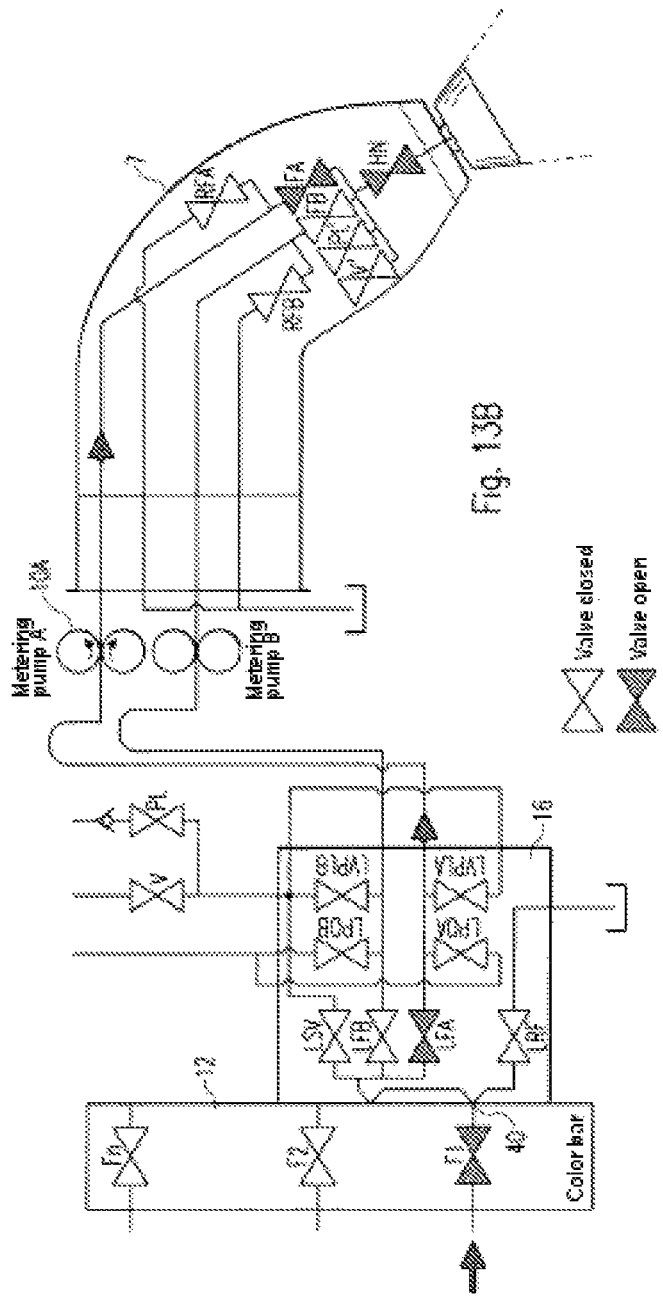

Fig. 13C

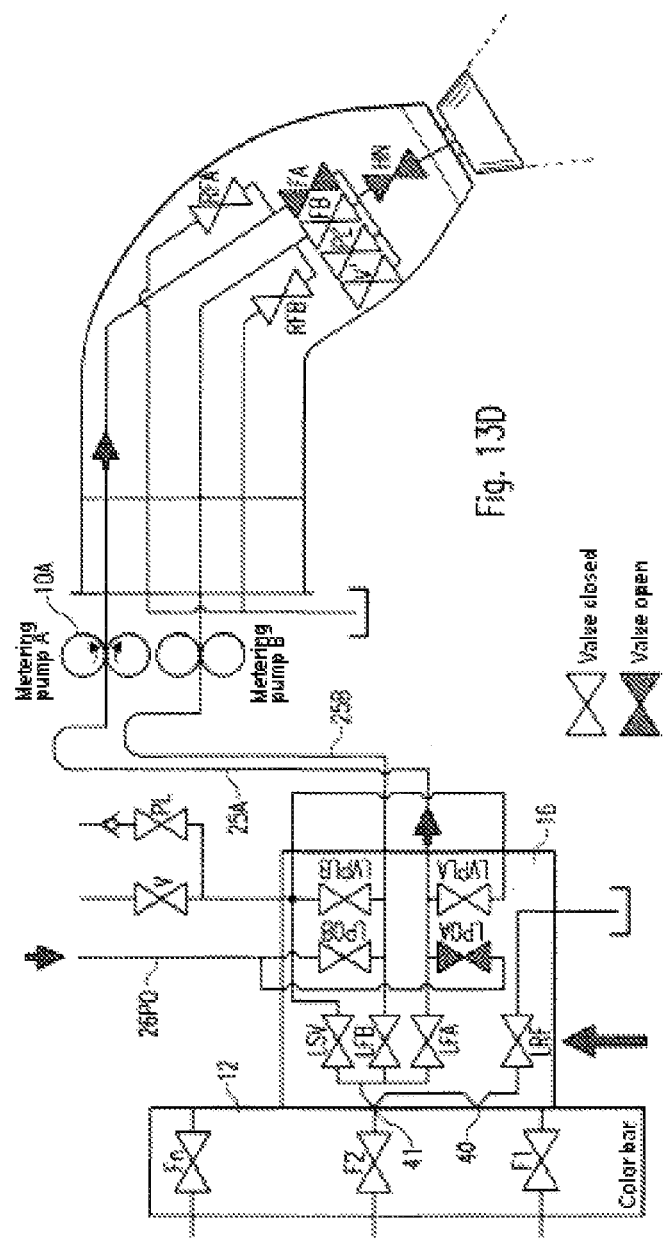

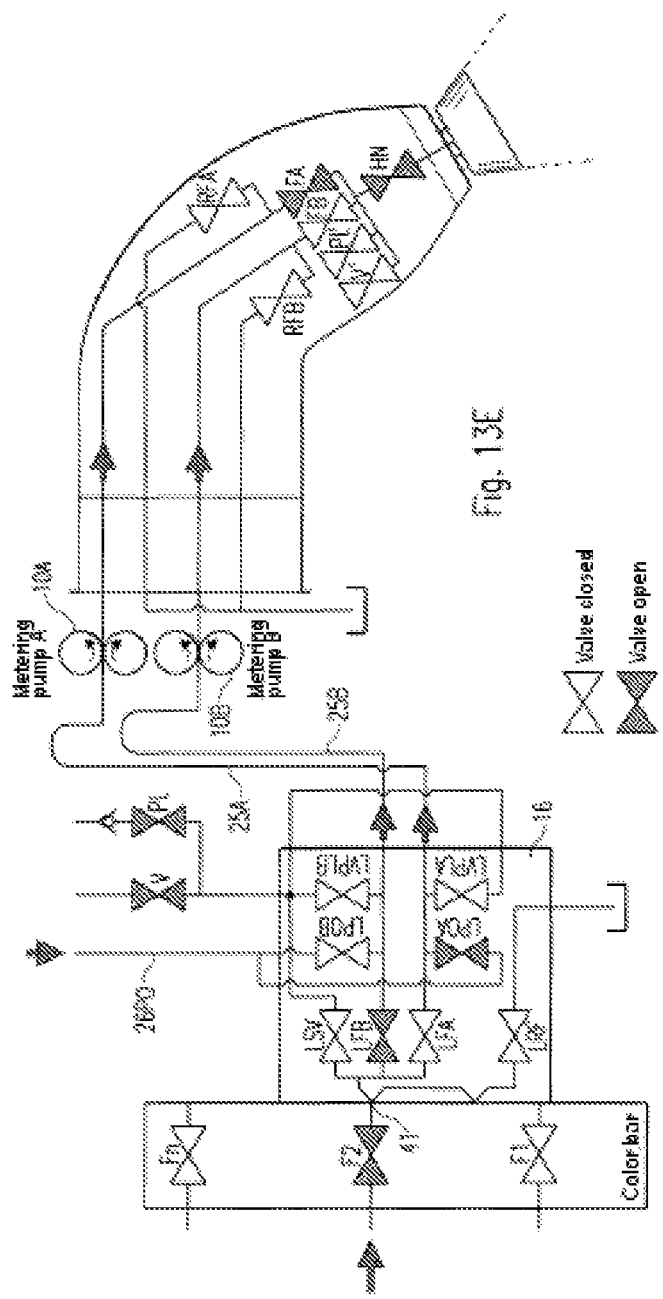

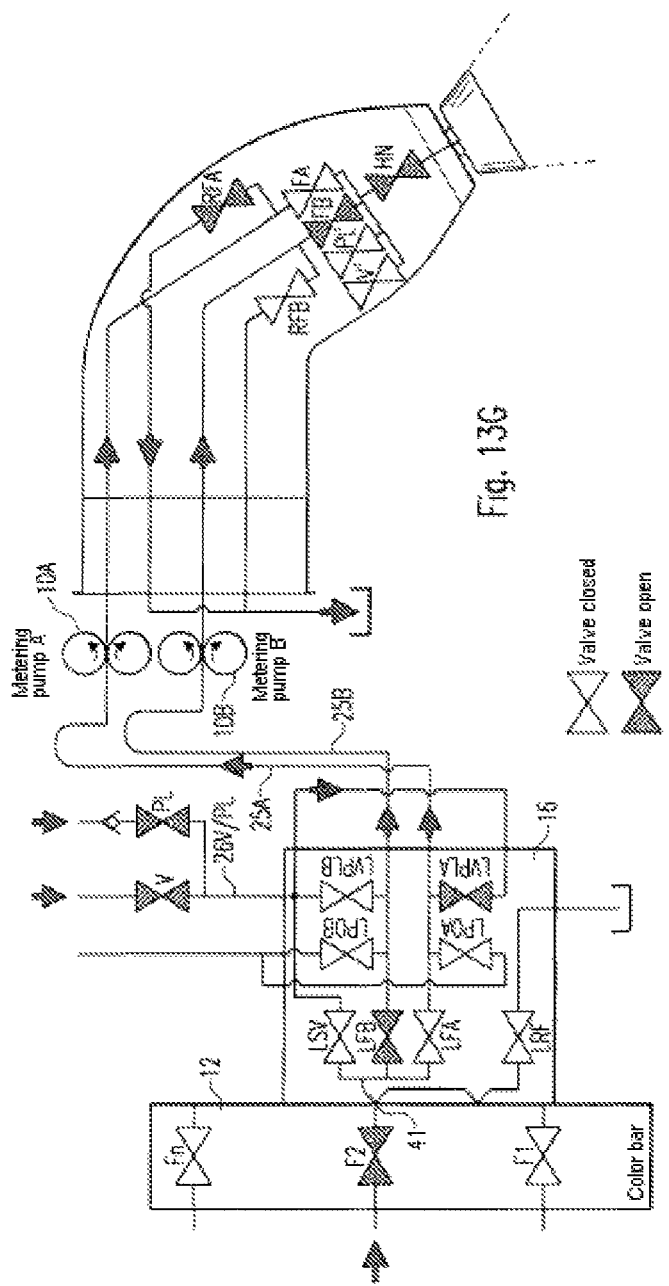

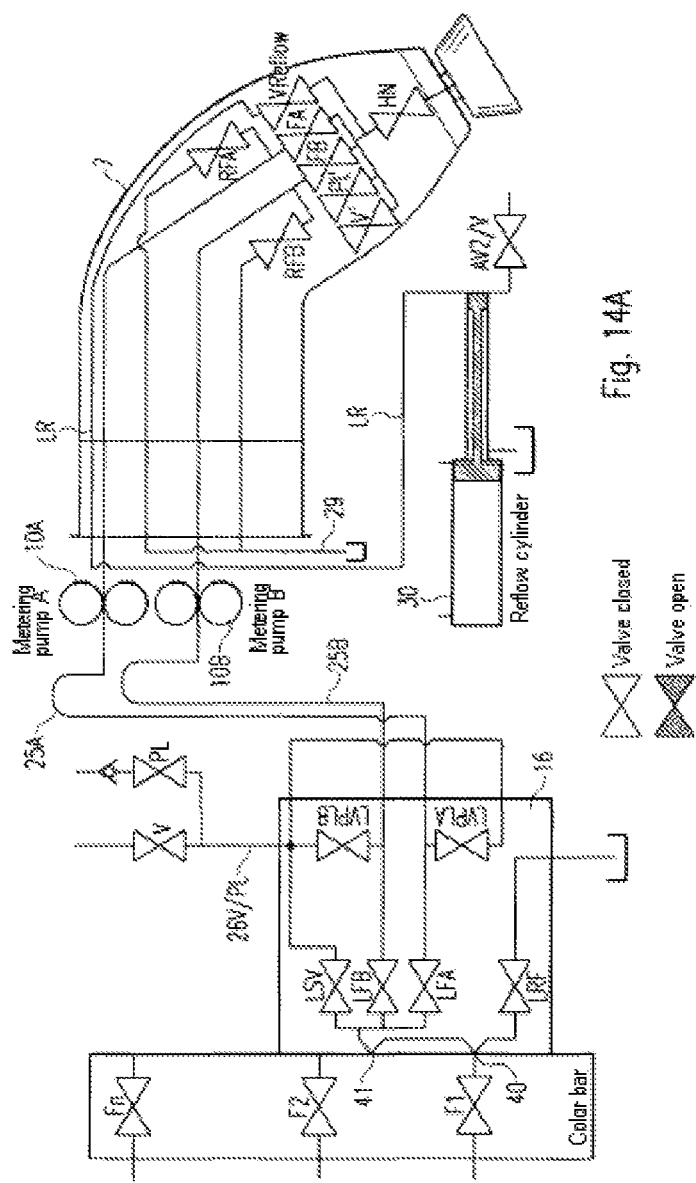

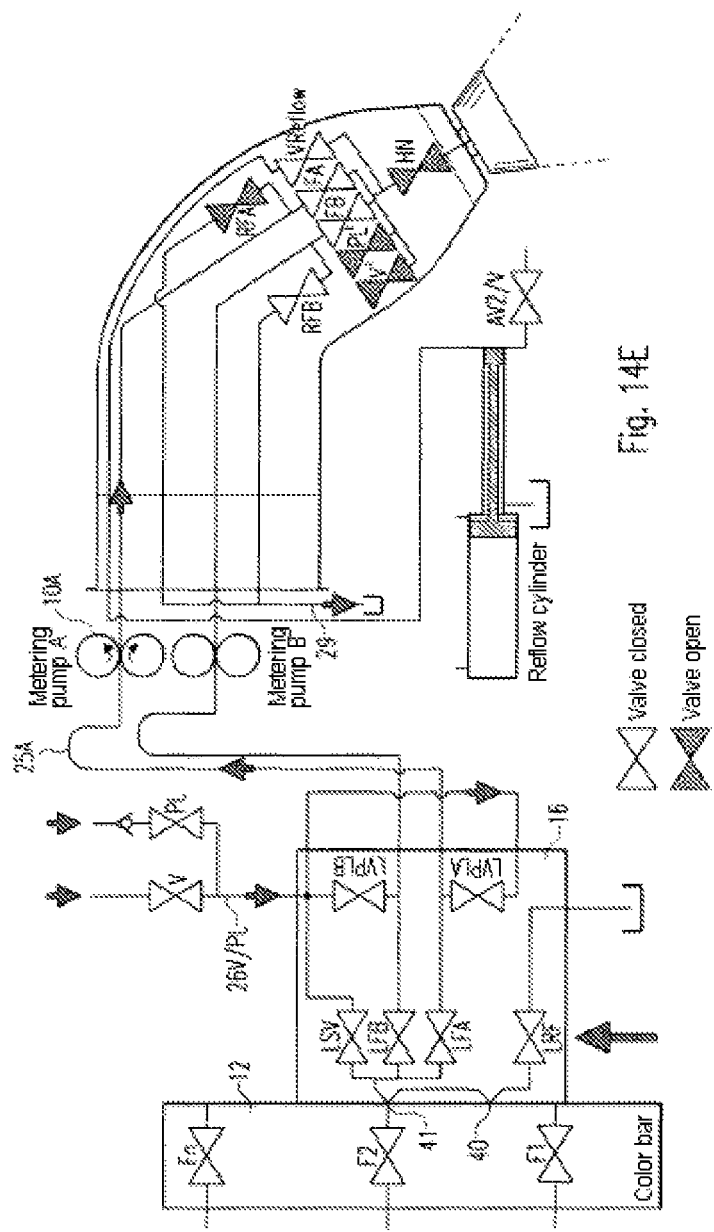

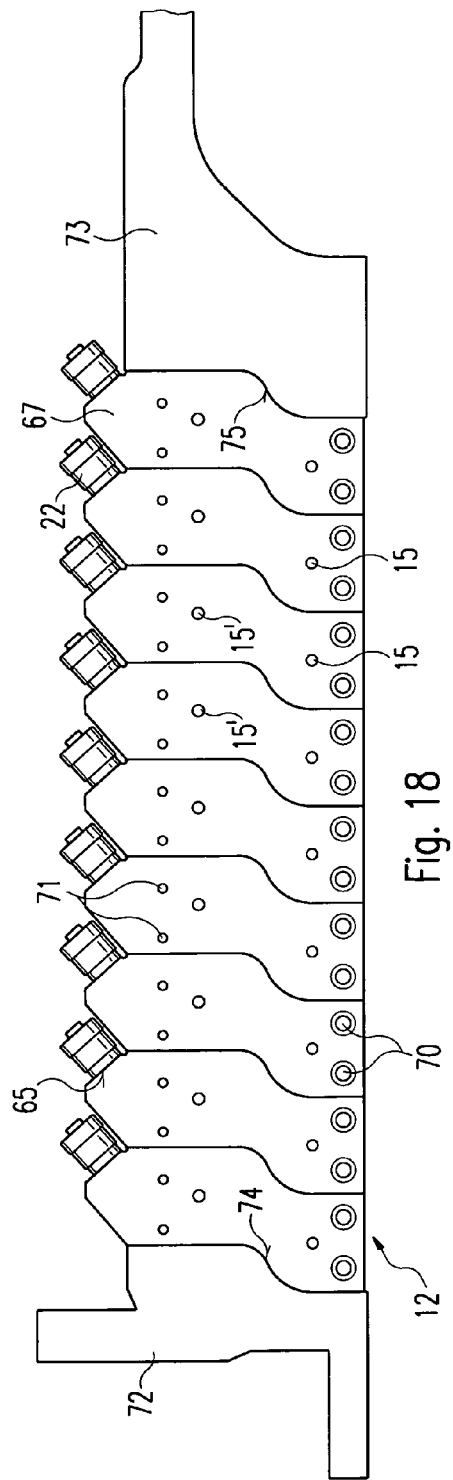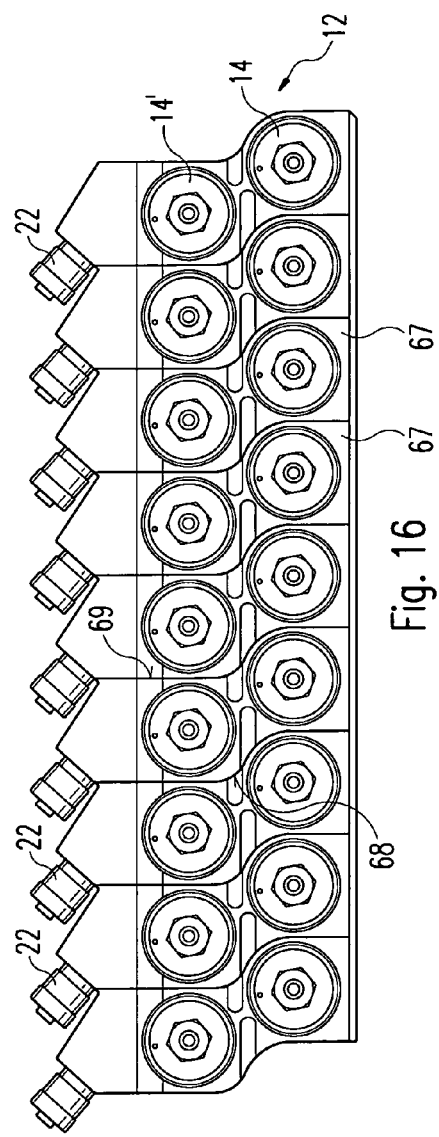

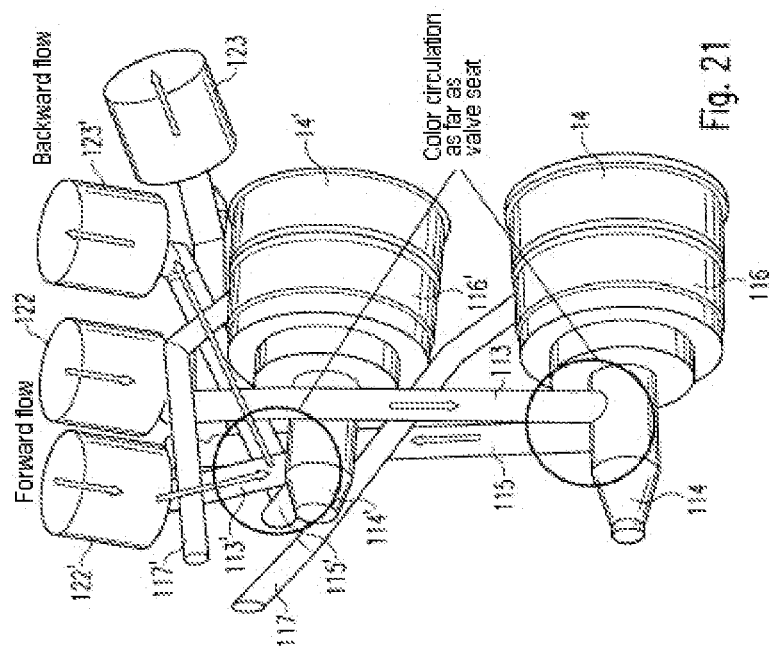
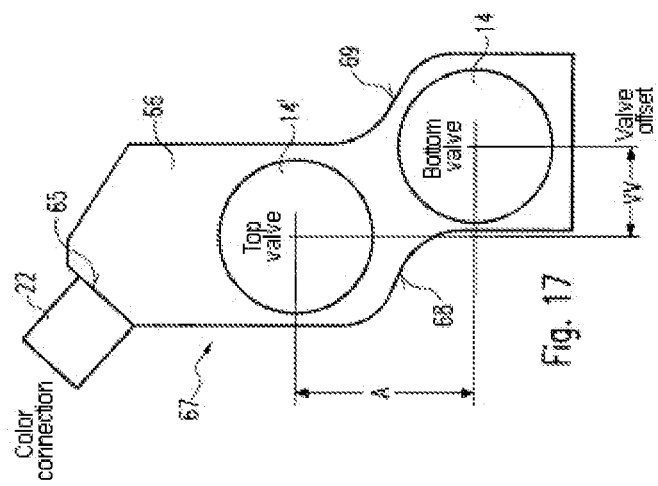

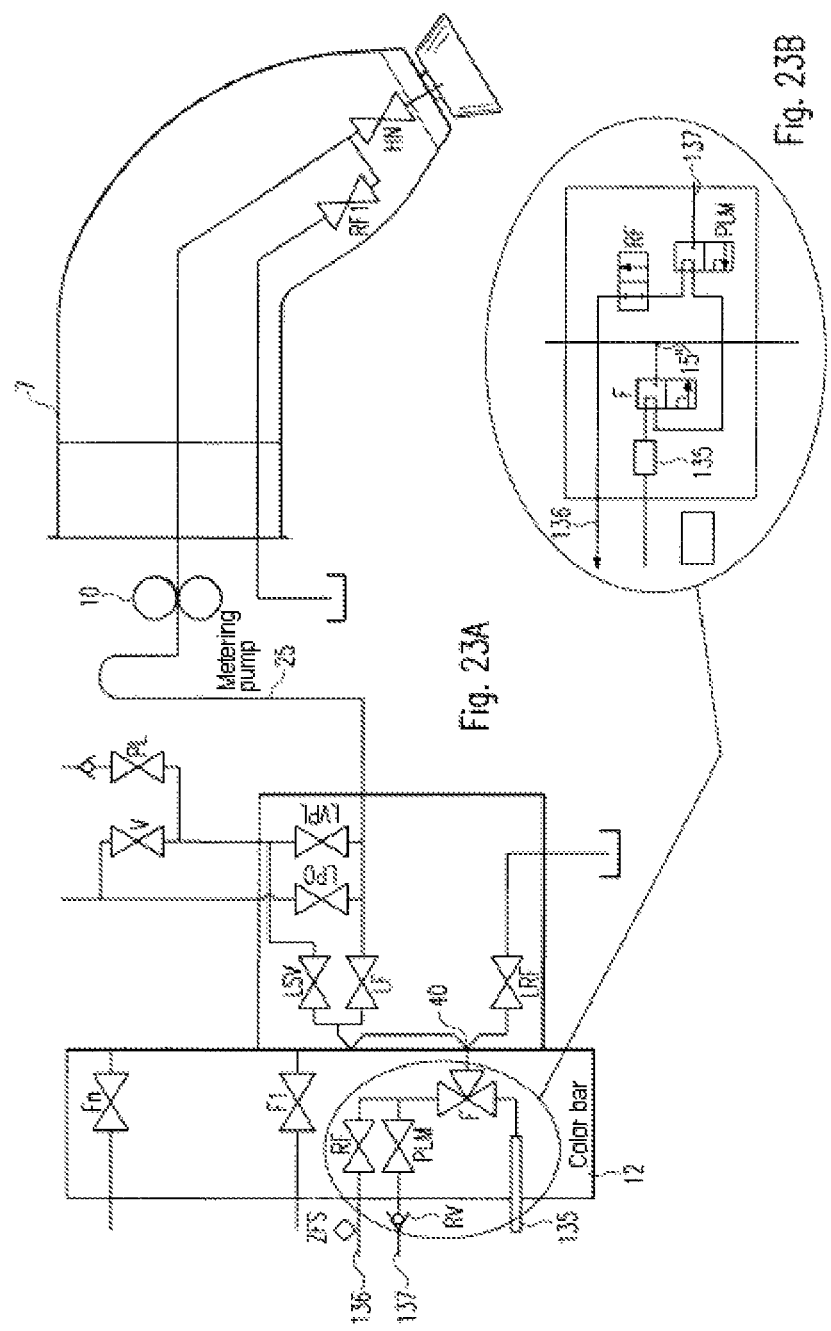

PAINTING ROBOT AND ASSOCIATED OPERATING METHOD

CROSS-REFERENCE TO RELATED APPLICATIONS

This application is a National Phase application claiming the benefit of International Application No. PCT/EP2009/001641, filed Mar. 6, 2009, which claims priority to German Patent Application Nos. DE 10 2008 015 258.7, filed Mar. 20, 2008, DE 2008 015 494.6, filed Mar. 25, 2008, and DE 2008 037 035.5, filed Aug. 8, 2008. The complete disclosures of each of the above-identified applications are hereby expressly incorporated by reference herein in their entireties.

BACKGROUND

The present disclosure relates to a painting robot for painting motor vehicle bodies according to the preamble of claim 1. Here, "painting robots" are to be understood to mean any program-controlled multi-axis coating machines or other movement machines. The present disclosure also relates to a corresponding operating method for such a painting robot.

In modern painting installations for painting motor vehicle bodies, use is made of multi-axis painting robots which guide as an application device for example a rotary atomizer and allow a highly efficient painting operation.

Color changes are sometimes or often necessary if the motor vehicle bodies are to be painted with differently colored paints. The known painting robots therefore have a color changer described, for example in DE 103 35 358 A1. Known painting robots may have a color changer that is connected on the inlet side to a plurality of color feed lines, via which differently colored paints are supplied. In the color changer, the individual color feed lines may open via a respective color valve into a common central color channel which, via a paint pressure regulator and a metering pump, supplies the rotary atomizer with the paint to be applied.

In this design of the color changer, the central color channel between the color changer and the main needle valve of the atomizer must generally be flushed in the event of a color change before a different paint having a new color can be applied. The flushing of the central color channel in the event of a color change is important since the paint residues remaining in the central color channel in the event of a color change would otherwise contaminate the new paint.

However, one problem here is the fact that, in the event of a color change, the volume of paint between the color changer and the main needle valve of the atomizer must be discarded so that, in the case of a color changer having 24 possible colors for example, a paint loss of between 45 and 55 ml occurs. In order to minimize the paint losses occurring during a color change, therefore, the color changer is typically mounted as close as possible to the atomizer, that is to say in the distal robot arm, which is also known as "arm 2", and to which a wrist (hand axis) for the atomizer is attached.

However, the mounting of the color changer in the distal robot arm has until now required such a large amount of space in the distal robot arm that the known painting robots having a color changer mounted in the distal robot arm are suitable only for exterior painting, that is to say for the painting of outer faces of the motor vehicle bodies, since in exterior painting the size of the distal robot arm plays only a subordinate role.

By contrast, for painting the interior of motor vehicle bodies, it has to date not been possible to use any painting robots in which the color changer is mounted on the distal robot arm, since painting of the interior requires narrow, slim robot arms which can be introduced and articulated through body openings (e.g. door openings) into the interior of the motor vehicle bodies in order to be able to paint the inner faces in the interior. In the case of the known painting installations for painting motor vehicle bodies, therefore, in order to paint the interior, use is made of painting robots having a different design, in which the color changer is not mounted on the distal robot arm, the higher paint losses being accepted in order to allow a slimmer design of the distal robot arm to permit the robot to extend through a vehicle opening, or instead complex technologies such as, for example, paint containers within in the atomizer or pigging systems with piston metering means.

One disadvantage with the known painting installations, therefore, is the fact that different types of robots have to be used for interior painting on the one hand and for exterior painting on the other hand, which generally, and in any event in the case of a non-optimal design, also requires different application technology. However, the different designs of the painting robots and of the associated application technology lead to increased effort and cost in terms of construction and logistics of coating installations.

Accordingly, there is a need for a correspondingly improved painting robot.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 10 shows the "push-out mode" in the form of a flowchart;

FIGS. 11A-11E show different operating states of the painting robot in the context of the so-called "reflow mode," according to an exemplary illustration;

FIG. 12 shows the "reflow mode" in the form of a flowchart;

FIGS. 13A-13H show different operating states of an A/B system for the push-out mode and a corresponding temporal sequence diagram, according to an exemplary illustration;

FIGS. 14A-14H show different operating states of an A/B system for the reflow mode and a corresponding temporal sequence diagram, according to an exemplary illustration;

FIG. 16 shows a modular color bar of a color changer which is suitable for the painting robot, according to an exemplary illustration;

FIG. 17 shows a schematic view of one module of the color bar from FIG. 16, according to an exemplary illustration;

FIG. 18 shows the rear side of the color bar of FIG. 16, according to an exemplary illustration;

FIG. 21 shows a view of the valve arrangement of the exemplary module of FIG. 19 with the pipes in the interior of the module body which are connected to the valves, according to an exemplary illustration;

FIG. 23A shows a schematic view of the valve arrangement of the exemplary module of FIG. 22 and the connection thereof to the atomizer of the painting robot, according to an exemplary illustration; and FIG. 23B shows a detail view of the valve arrangement of the exemplary module for the special color supply in the color bar of FIG. 23A, according to an exemplary illustration.

DETAILED DESCRIPTION

Figure 1:
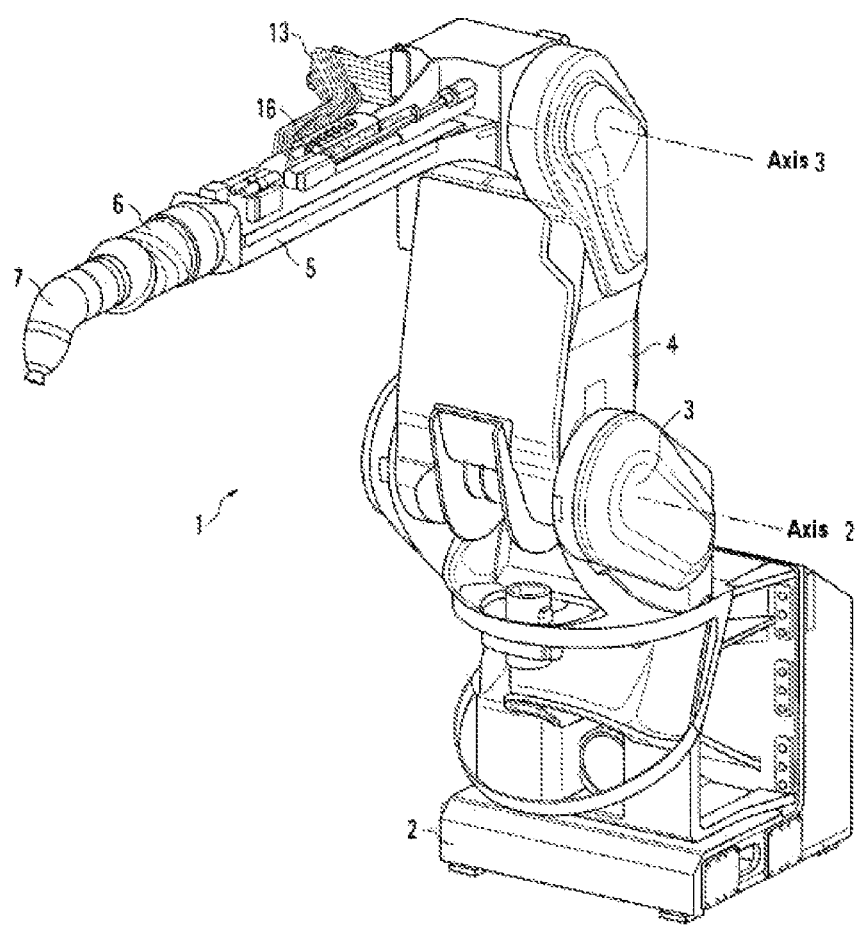
FIG. 1 shows a perspective view of a painting robot according to an exemplary illustration.

The exemplary illustrations encompass the general technical teaching of providing a painting robot which is suitable in design terms, e.g., due to an advantageous arrangement of components with a small space requirement, both for painting the outer faces of motor vehicle bodies and for painting the inner faces of the motor vehicle bodies.

For example, an exemplary robot is able to introduce the atomizer through door openings (and in special cases through window openings) into the interior of the body in the assembled state, that is to say with doors and hoods as obstacles, in the engine and trunk compartments of the body, and to an extent sufficient for painting the interior. In typical cases, the vertical height of the "arm 2" (or of the distal machine arm in other painting machines) with the arm in the horizontal position may be no greater than 350 millimeters (mm), and in at least one exemplary illustration no greater than 300 mm, in the region of its atomizer-side end. Additionally, a maximum width measured transversely thereto in this region may be no greater than 300 mm, and in at least one exemplary illustration no greater than 250 mm, wherein the vertical height of the arm is usually more important than its width. These limits for sufficiently flat (height) and/or narrow (width) dimensioning generally may advantageously be observed along a sufficient length in the direction of the pivot axis of this arm, for example up to at least 300 mm proceeding from the attachment face of the hand axis, in other cases up to 500 mm. In its rear region the arm may then be wider, e.g. for lateral tube exit, and also higher for design reasons.

Such slim robot arms may be employed for the interior painting of bodies, but for space reasons they have to date not been able to contain the components necessary for exterior applications, such as color changers, metering pumps, paint pressure regulators, etc., and therefore they had the aforementioned disadvantages such as paint losses, flushing losses and time losses, etc.

An exemplary painting robot generally comprises one or more robot arms for spatially positioning an application device (e.g. a rotary atomizer, air atomizer, airless atomizer or ultrasonic atomizer). Any application device may be employed that is convenient. The robot arms may be arranged kinetically in series or also in parallel, or in combined series and parallel. For example, the parallel kinematics as generally described in EP 1 614 480 B1 Justin regard to a single (the distal) arm may also be considered. In the exemplary painting robot, the distal robot arm (i.e. the so-called "arm 2") is by contrast so narrow and slim that the distal robot arm with the application device mounted thereon can advantageously be introduced through body openings (e.g. window openings) into the interior of the motor vehicle bodies in order to paint the inner faces therein.

Furthermore, the exemplary painting robot may advantageously include a color changer which, in order to minimize the paint losses occurring in the event of a color change, may be mounted on the distal robot arm ("arm 2") of the painting robot, which is achieved by a special design of the color changer without impairing the suitability for interior painting.

In one exemplary illustration, the color changer comprises a plurality of docking points (e.g. on a color bar) which are supplied with the differently colored paints by the individual color feed lines. In addition, the color changer in this example comprises a movable color extractor (e.g. a docking carriage) which can selectively dock onto one of the docking points and, in the docked state, extracts the paint from the associated color feed line and supplies the extracted paint to the common color line. In order to select the paint having the desired color, the color extractor is therefore positioned in such a way that the color extractor docks onto the associated docking point, whereupon the paint can be extracted from the associated color feed line via the docking point. In contrast to known color changers, e.g., as described above, therefore, in this example the color changer does not have a central color channel, so that the color changer, due to its design and even in the event of a malfunction of the color valves or an incorrect actuation of the color valves, prevents any paint contamination from being able to occur since in each case only one single color feed line is connected to the color extractor.

Also in the above-described exemplary color changer, there may be arranged in the individual color feed lines a respective color valve which selectively blocks or enables the paint flow through the respective color feed line. In this case, the individual color valves are in each case controlled by one and the same control signal, wherein this may be for example a pneumatic, electrical or mechanical control signal. The control signal for actuating the individual color valves may advantageously be passed from the color extractor via the respectively docked docking point to the respective color valve, so that the control signal can reach one of the color valves only when the color extractor is docked onto the associated docking point. This type of actuation of the color valves inherently ensures that the individual color valves can be opened only when the color extractor is docked onto the associated docking point. The individual color valves may thus be designed in such a way that the color valves block the associated color feed line when there is no control signal. As the color valves or instead of conventional color valves, use may also be made of elements known as "quick-locking" or "quick-connect" couplings, externally actuated non-return valves or valves which open as a result of actuation by a plunger.

The movable color extractor may be, for example, a docking carriage which is linearly displaceable relative to the docking points of the individual color feed lines. However, it is also possible as an alternative that the color extractor is rotatable in order to dock onto the desired docking point.

In one exemplary illustration, a color changer generally as described in the patent application EP 1 245 295 A2 may be incorporated, so that the content of said patent application is hereby fully incorporated by reference herein in its entirety.

Furthermore, the exemplary painting robot may comprises two separate flushing circuits, e.g., a first flushing circuit for flushing the docking points of the color changer, and a second flushing circuit for flushing the common color line for the differently colored paints between the color changer and the atomizer. The two flushing circuits may be separate or at least can be separated, so that the docking points can be flushed independently of and separately from the common color line. With this design, therefore, it is possible that the common color line for the differently colored paints is flushed as far as the atomizer, while the docking points of the color changer are being flushed simultaneously or at least in a temporally overlapping manner. This simultaneous or temporally overlapping flushing reduces the color change time in the event of a color change. In addition, during a color change, the color extractor can already approach and dock onto a new docking point while the common color line for the differently colored paints is being flushed as far as the atomizer, which likewise helps to achieve a reduction in the necessary color change time.

With this design, the separation of the two flushing circuits may take place by means of at least one separating valve which is arranged in the color extractor.

In this case, the first flushing circuit may lead from a flushing agent feed line via a flushing agent valve through the common color line downstream of the separating valve to the atomizer and finally optionally via a return valve into a return line or via the main needle valve of the atomizer. In the context of the exemplary illustrations, therefore, there are various possibilities for the flushing of the common color line.

On the one hand, it is possible that, after the flushing of the common color line, the thinning fluid which may serve as the flushing agent is sprayed out by the atomizer in the same way as the paint to be applied. In this case, the flushing agent introduced into the common color line acts as a displacement medium and pushes out via the atomizer the paint still located in the color line. Also possible is the mode of operation referred to as the "push-out mode", in which the residual paint still located in the line and sprayed out by the atomizer continues to be used practically in its entirety for painting until finally the flushing agent which serves as the displacement medium is dispensed by the atomizer. In this "push-out mode", therefore, precise knowledge of the switchover time at which the color valve is closed and the flushing agent valve is opened is generally necessary. The painting operation must then be terminated with a sufficient safety time interval before the flushing agent which serves as the displacement medium is dispensed by the atomizer. A "push-out" can be carried out in any manner that is convenient, e.g., by using a pig which pushes the paint, wherein the pig can be pushed by the flushing agent. However, if the residual paint is pushed directly by a flushing agent (the same applies to the reflow mode), lines which have a sufficiently small tube diameter are necessary in order to avoid the known "lance effect". The internal diameter of all lines and channels in components through which paint is pushed directly by the flushing agent or other pushing medium may be smaller than 6 mm. For example, in one illustration the internal diameters are between approximately 2 and approximately 4 mm. Furthermore, these lines and channels may also avoid corners and sharp bends with regard to the lance effect and in order to avoid swirling, etc.

On the other hand, for the flushing of the common color line, it is possible that there is arranged in the atomizer a first return valve, via which the flushing agent can be drained off into a return line.

The two types of flushing mentioned above can also be combined with one another by first using the paint pushed out of the common color line by the flushing agent for painting purposes. Shortly before the flushing agent reaches the main needle valve of the atomizer, the main needle valve is then closed and the return valve in the atomizer is opened so that the flushing agent is not sprayed out.

Furthermore, the color change system according to the exemplary illustrations allows reuse of the paint located in the common color line between the color changer and the atomizer by pushing the paint located in the common color line between the color changer and the atomizer in the event of a color change back via the docking point into the associated color feed line, for which reason this operating mode is also known as the "reflow mode". The pushing of the paint back out of the line section of the common color line between the color changer and the atomizer into the color feed line may take place by virtue of the fact that a pushing agent which serves as a displacement medium, such as e.g. flushing fluid, is introduced into the common color line in the region of the atomizer upstream of the main needle valve of the atomizer. The flushing agent introduced into the common color line then pushes the paint located in the common color line back into the associated color feed line. In this example, therefore, a flushing agent feed line may open into the common color line upstream of the main needle valve of the atomizer via a flushing agent valve arranged in the atomizer, in order to push the paint remaining in the common color line back through the color changer into the associated color feed line for later reuse, the introduced flushing agent serving as a displacement medium.

The reflow mode can also be carried out in any manner that is convenient, e.g., by using a pig.

The introduction of the displacement medium or pushing medium, for example of a solvent or flushing agent, into the atomizer may advantageously not take place directly via the flushing agent feed line and the flushing agent valve but rather may take place via a flushing agent metering means which is arranged in the flushing agent feed line upstream of the flushing agent valve and which can push the flushing agent located in the flushing agent metering means into the common color line when the flushing agent valve is opened.

"Metering means" in this case means a device which is intended to convey a predefined volume of liquid (dose) but, in contrast to the metering pumps used for coating material, does not have to produce a defined volume flow per unit of time.

Such a metering means, e.g. a piston metering means, which may advantageously be acted upon only by pressure and operates without defined time or speed control, has significant advantages e.g. over a toothed wheel metering pump operating volumetrically. Besides the low control complexity, the advantage of much lower losses is obtained in particular, said losses in the case of metering pumps being caused by slip and becoming greater constantly and moreover in an undefined manner due to wear during operation.

A further flushing agent valve for controllably filling the flushing agent metering means via the flushing agent feed line may be located upstream of the flushing agent metering means. On the inlet side, therefore, the flushing agent metering means may be filled with the flushing agent from the flushing agent feed line via the flushing agent valve. By contrast, on the outlet side, the flushing agent metering means may be connected via the flushing agent valve to the common color line in order to be able to meter into the common color line the flushing agent which serves as a displacement medium.

In one exemplary illustration, the flushing agent metering means has a metering volume which is substantially identical to the filling volume of the color line between the respectively docked color valve and the main needle valve of the atomizer. The metering volume of the flushing agent metering means is thus sufficient to fill the entire line section of the common color line between the color changer and the atomizer with the flushing agent which serves as the displacement medium, and thus to push back into the associated color line the paint located in this line section.

By way of example, the flushing agent metering means for the "reflow mode" may be designed as a metering cylinder or may be formed by a pigging tube.

There are various possibilities for the drive of the flushing agent metering means, wherein the flushing agent metering means may be electrically or pneumatically driven.

It has already been explained above that the exemplary color changer may include a movable color extractor which can dock onto one of a plurality of docking points in order to extract the paint of the desired color from the associated color feed line via the docking point. In this case, there may advantageously be provided a clamping device which mechanically clamps together the color extractor (e.g. the docking carriage) and the respective docking point (e.g. in the color bar) in the docked state. This advantageously makes it possible for the color extractor to dock onto the respective docking point without any external force, so that no holders or supports of large size are necessary.

In one exemplary illustration, the clamping device comprises a groove with an undercut, onto which a movable clamping element latches. By way of example, the individual color feed lines and the associated color valves and docking points may be arranged in a row in a color bar, wherein the color bar has the groove for clamping to the color extractor. In this case, the color extractor may consist of a docking carriage which is displaceable relative to the color bar in the longitudinal direction of the groove, wherein the docking carriage can pull toward itself by means of a docking cylinder a gripping disc guided in the groove in order to clamp the docking carriage to the color bar.

Despite the clamping between the docking carriage on the one hand and the color bar on the other hand, a leakage may occur in the region of the docking points in the event of a fault, e.g. in the event of failure of one of the seals provided therein, whereby paint escapes into the groove in the color bar. It is therefore advantageous if the groove has no undercut on its underside so that paint which has escaped as a result of a leakage can flow downward out of the groove. In one example, therefore, the groove has an undercut only on its upper groove flank, whereas the groove has no undercut on its lower groove flank.

It has already been mentioned in the introduction that the color changer may advantageously be mounted on the distal robot arm ("arm 2") so that the common color line between the color changer and the atomizer is as short as possible, which leads to correspondingly low losses during a color change. In addition, a paint pressure regulator and/or a metering pump for the coating material may also advantageously be mounted on the distal robot arm, so that generally essential parts of the application technology are located on the distal robot arm. Furthermore, it is advantageous if there is also arranged in the distal robot arm a servo-pneumatic actuator for moving the color extractor (e.g. the docking carriage) relative to the docking points (e.g. on the color bar) in order to select the paint having the desired color.

Here, a "metering pump" for metering the coating material means a conveying device by means of which the volume flow, that is to say the volume of material conveyed per unit of time, can be changed automatically during the application, e.g. depending on the sub-areas presently being coated on the object to be coated. Typical examples of metering pumps include piston metering means driven by an electric motor or in particular toothed wheel pumps or other rotary displacement pumps. The change in the metering rate according to requirements can be achieved in any manner that is convenient, e.g., by controlling the rotary speed of the drive motor of the metering pump.

Furthermore, it is advantageous if the paint pressure regulator, the actuator for the color extractor and/or the metering pump are arranged in a common connection block, thereby omitting connecting tubes between the paint pressure regulator and the metering pump and thus disruptions caused by the tubes. In addition, the integration of the paint pressure regulator and of the metering pump in a single connection block allows short connection lengths and also a simple and compact design. The paint pressure regulator may be installed directly on the metering pump.

In another exemplary illustration, a particular connection of the individual color feed lines to the color changer may be provided. More specifically, receiving bores for each of the individual color lines may be arranged in the color changer, into which bores the color feed lines are inserted for connection to the color changer. At their free end, the color feed lines in this case have an angled clamping surface, which may consist for example of a conical outer surface running coaxially to the receiving bore. Also located in the color changer is a clamping bore which runs substantially at a right angle to the receiving bore and opens into the receiving bore, wherein the clamping bore has an inner thread. A clamping screw (e.g. an Allen screw, Torx screw, slotted screw or cross-head screw or the like) can then be screwed into the clamping bore, which screw presses with its free end against the angled clamping surface at the free end of the color feed line and thus axially secures the color feed line and clamps it in the receiving bore.

The above-described exemplary connection design is also suitable for connecting other lines.

Furthermore, the exemplary illustrations also include a corresponding operating method for a painting robot, wherein the painting robot is used both for painting the outer faces and for painting the inner faces of the motor vehicle bodies.

In the event of a color change, an exemplary operating method may provide that the movable color extractor (e.g. a docking carriage) of the color changer is docked onto one of a plurality of docking points (e.g. on a color bar) which are supplied with differently colored paints from a plurality of color feed lines.

After docking, the paint to be applied may then be extracted from the associated color feed line via the docked docking point, and the atomizer may be supplied with the paint selected by the color changer via a common color line for the differently colored paints.

Furthermore, an exemplary operating method may provide that the docking points in the color changer are flushed with a flushing agent via a first flushing circuit, whereas the common color line between the color changer and the atomizer is flushed with a flushing agent via a second flushing circuit, wherein the first flushing circuit is separate or is separated from the second flushing circuit.

Advantageously, the docking points and the common color feed line between the color changer and the atomizer may in this case be flushed simultaneously or at least in a temporally overlapping manner in order to shorten the necessary flushing time and thus also the color change time.

The two flushing circuits may be separated from one another by at least one separating valve in order to allow the simultaneous or temporally overlapping flushing.

In the context of the "push-out mode" already mentioned above, the exemplary operating methods may provide in the event of a color change that the paint remaining in the common color line is pushed out of the common color line via the second flushing circuit optionally through a return valve located in the atomizer into a return line or via the main needle valve of the atomizer.

By contrast, in the "reflow mode" already mentioned above, the exemplary operating methods may provide that the paint remaining in the common color line is pushed back into the associated color feed line via the docking point of the color changer and is later reused.

The exemplary illustrations described herein may be suitable also for the application of two-component paints, wherein the additional components required, such as e.g. two metering pumps, can likewise be accommodated in the slim arm of the painting machine.

The exemplary illustrations are just as suitable as conventional painting robots, with color changers arranged in the vicinity of the atomizer, for electrostatic coating both with conductive paint such as e.g. water-based paint and also for other coating material with direct charging or external charging. In the case of non-conductive paints and the direct charging thereof in the atomizer, the exemplary docking color changer can be at the high-voltage potential of the atomizer, since the paint column between the color changer and the low-electrical potential or grounded color supply part of the robot is sufficient for insulation purposes. By contrast, in the case of conductive paint, the color changer may be grounded if, for example, a rotary atomizer with external electrodes is used.

FIGS. 1 to 8 show different views and parts of an exemplary painting robot 1 which is used in a painting installation for painting motor vehicle bodies, wherein the painting robot 1 is suitable both for painting the outer faces of the motor vehicle bodies and also for painting the inner faces of the motor vehicle bodies, as will be described in more detail below.

The painting robot 1 may be of any known design that is convenient. The robot 1 may include a robot base 2, which in this example can be fixedly mounted on a machine plinth. As an alternative, however, it is also possible to mount the robot base 2 with appropriate modification in a manner such that it can be displaced linearly on a rail, so that the painting robot 1 can move in the painting booth, e.g., parallel to the conveying direction of the motor vehicle bodies to be painted. For the purpose described here, it may also be advantageous to mount the rail in a raised manner, e.g., as generally described in (EP 1 609 532 A1). Accordingly, the robot 1 may be disposed at the height of the upper part of the body or above the roof thereof.

A robot arm 3 may be rotatably mounted on the robot base 2, wherein the robot arm is rotatable about a perpendicular axis of rotation relative to the robot base 2. A further robot arm 4 may be pivotably mounted on the robot arm 3.

Finally, a distal robot arm 5 may be pivotably mounted at the distal end of the robot arm 4, wherein the robot arm 5 guides an application element such as a rotary atomizer 7 via a conventional, e.g. three-axis or four-axis, robot hand axle 6.

Figure 2:
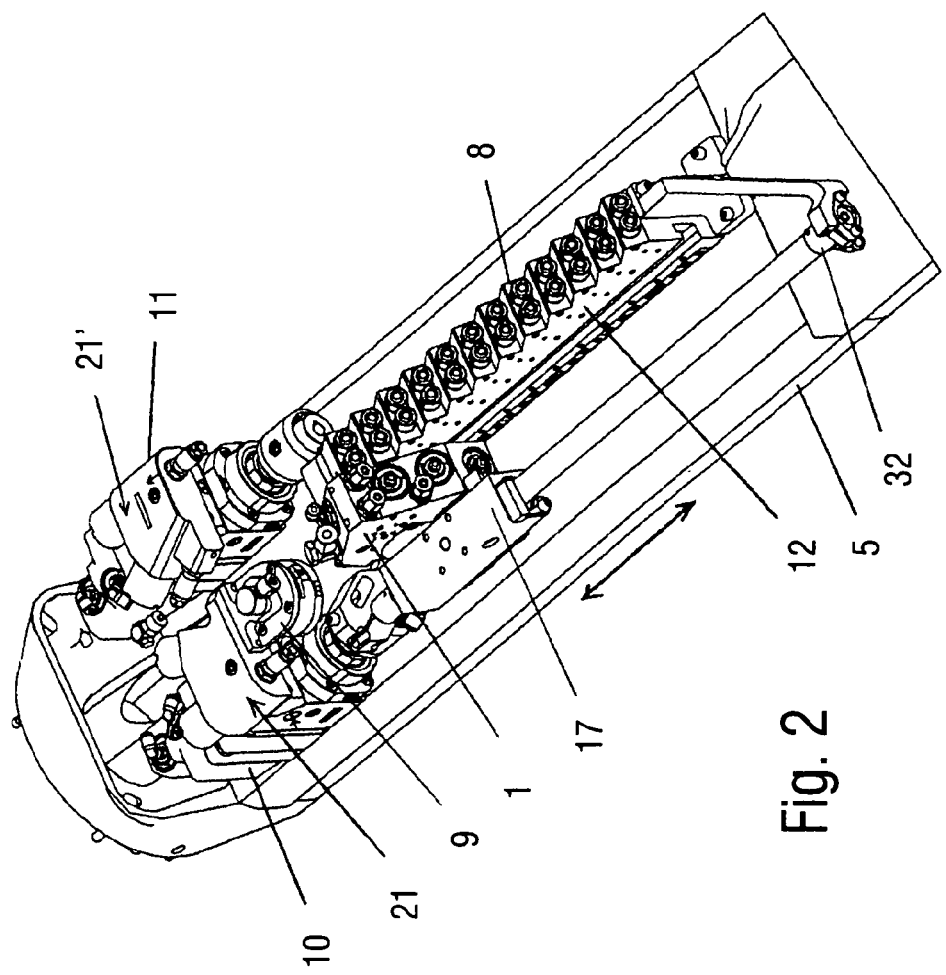
FIG. 2 shows a perspective view of the distal robot arm ("arm 2") of the painting robot according to an exemplary illustration.

The distal robot arm 5 is shown here without any housing cover, so that it can be seen that essential parts of the application technology are mounted on the distal robot arm 5. For example, as shown in FIG. 2 a color changer 8, a paint pressure regulator 9, a metering pump 10 for metering a stock paint and, in the example considered here concerning the application of two-component paints, a metering pump 11 for metering a hardener. The paint pressure regulator 9 may be any type that is convenient.

The color changer 8 comprises a so-called color bar 12 which is supplied with differently colored paints via numerous color feed lines 13, wherein the individual color feed lines 13 in the color bar 12 open via a respective color valve 14 (FIG. 5) into a respective docking point 15, from which the desired paint can be extracted. As color valves 15 with a small space requirement, needle valves which are advantageously controlled electrically or by a pneumatic piston drive and which have conical valve needles at their end may be provided. For example, color changers as described in DE 198 46 073A1, EP 1 250 964 B1, DE 10 2007 037 663.6 may be employed.

As will be explained in more detail below (FIGS. 16-18), the color valves 14 (FIG. 5) may be arranged, e.g., in a side face of the color bar 12 in one or more rows parallel to the longitudinal direction thereof (direction of the arrow in FIG. 3), with needle axes arranged transversely or perpendicular to this side face and thus parallel to the docking direction (of the linear drive 17 in FIG. 5). As is shown, the associated docking points 15 (FIG. 4) may likewise be located at equal distances from one another in one or more rows parallel to the longitudinal direction, e.g. in the side face of the color bar 12, advantageously on the side of the color bar 12 opposite the color valves. In the case of the illustrated arrangement with two rows, the docking points of one row may in each case be offset in the longitudinal direction of the color bar by half the distance between adjacent docking points relative to the docking points of the other row.

Furthermore, the color changer 8 may include a docking carriage 16 which is displaceable in the direction of the arrow (cf. FIGS. 2 and 3) relative to the color bar 12 in the longitudinal direction of the latter, wherein the docking carriage 16 is positioned in the direction of the arrow by, e.g., a servo-pneumatic linear drive 17 operating in any manner that is convenient with a pneumatic cylinder, in order to dock onto the desired docking point 15 of the color bar 12. As an alternative, a drive with an electric motor or some other linear drive which is controllable by stored control data may be used.

For precise positioning at the docking points, the linear drive may be provided with a measuring device 32 (FIG. 2) in any manner that is convenient. Since the atomizer 7 and in some cases also parts of the robot arm 5 may be under high voltage during operation, the measuring device 32 may in these cases be insulated against the high voltage. In the case of an electric measuring device, it may furthermore be encapsulated in order to meet the requirements for protection against explosion. The same applies to any other electrical elements present in the robot arm.

The atomizer-side connection line arrangement of the docking carriage 16 may be located in a U-shaped cable carrier chain or guide chain which is movable parallel to the direction of displacement in the manner of a so-called energy chain as used on painting machines, said chain being attached to the docking carriage at one end and fixed in a stationary manner at the other end. The atomizer-side line arrangement is connected to openings of the docking carriage 16 which are in each case aligned with one of the rows of docking points 15 of the color bar 12. Further docking openings may be provided in the docking carriage 16 for flushing purposes and for pneumatic control signals for switching the color valves 14.

Figure 3:
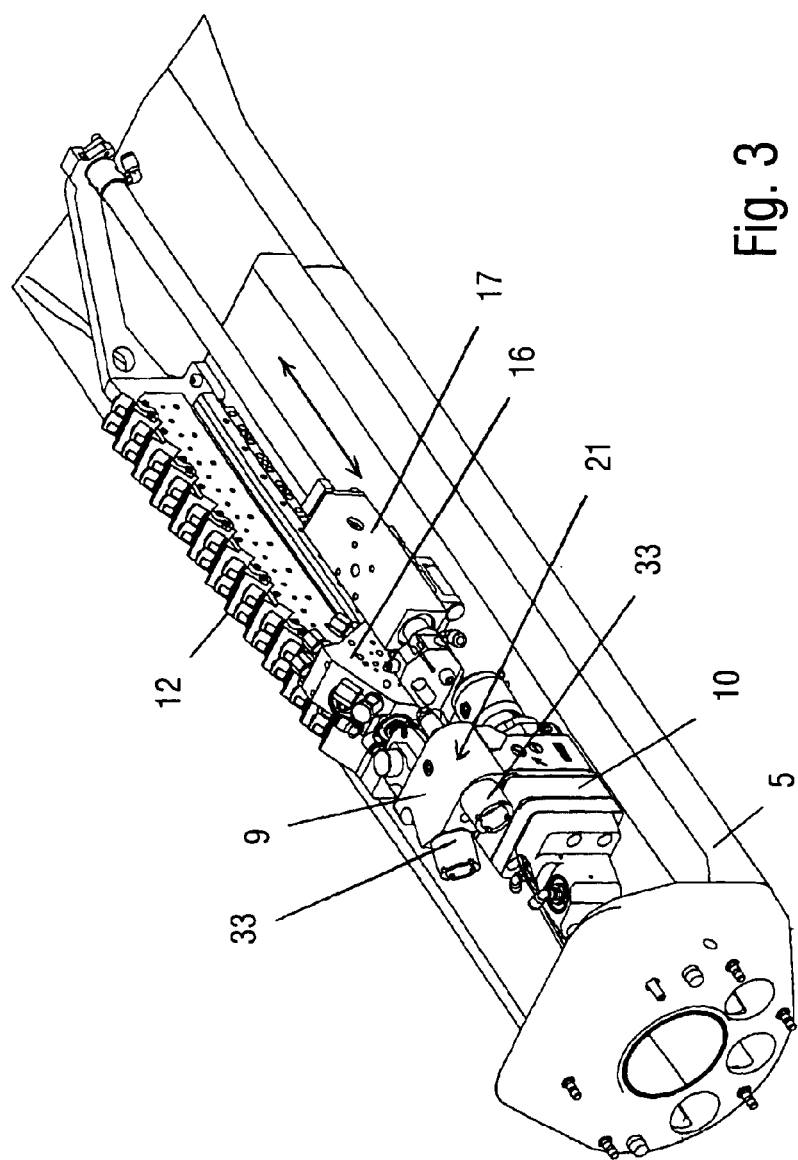
FIG. 3 shows another perspective view of an exemplary distal robot arm.
Figure 4:
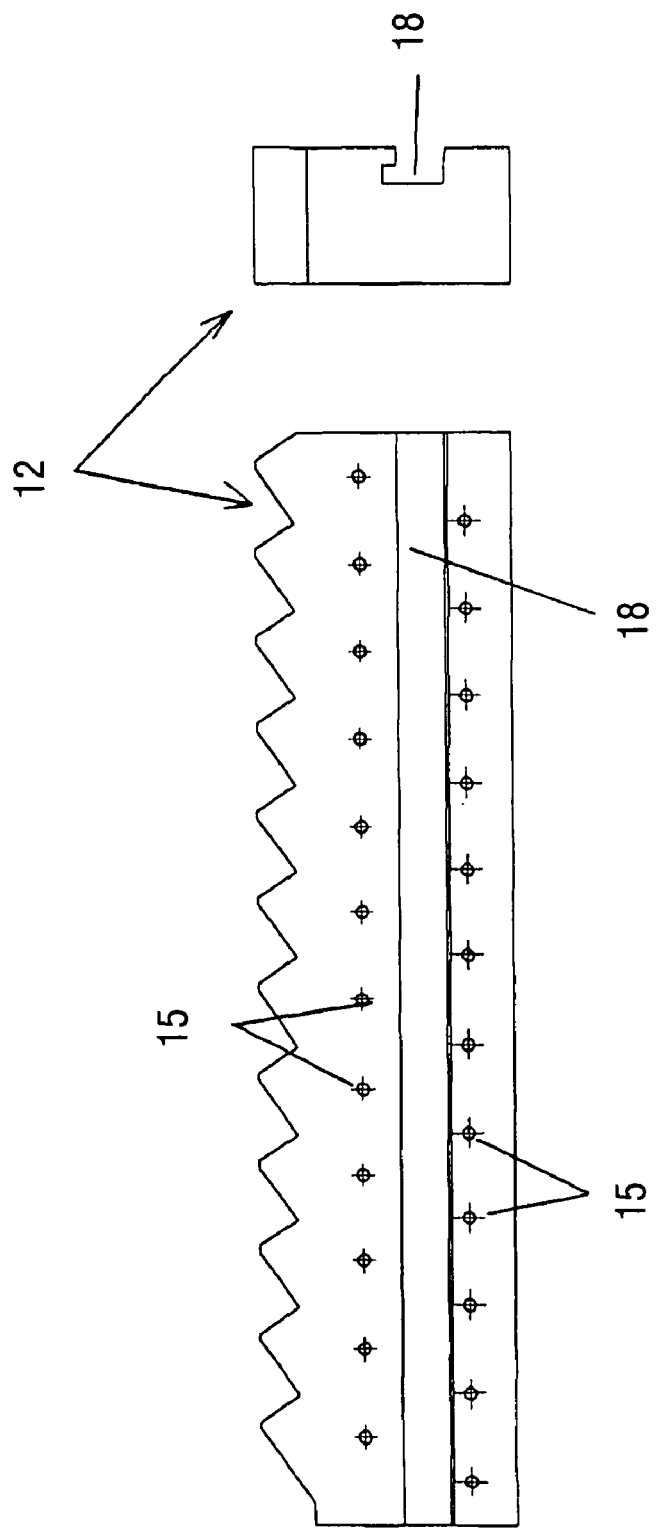
FIG. 4 shows a perspective view of a color bar which is part of a color changer, according to one exemplary illustration.

In the case of the color bar 12 for e.g. 24 colors which is shown in FIGS. 2 to 4, it is assumed that the color tubes are connected as stub lines. If there is space for, e.g., twice the number of color connections, the color bar may also be designed for color circulation, as will be described in more detail below.

Figure 5:
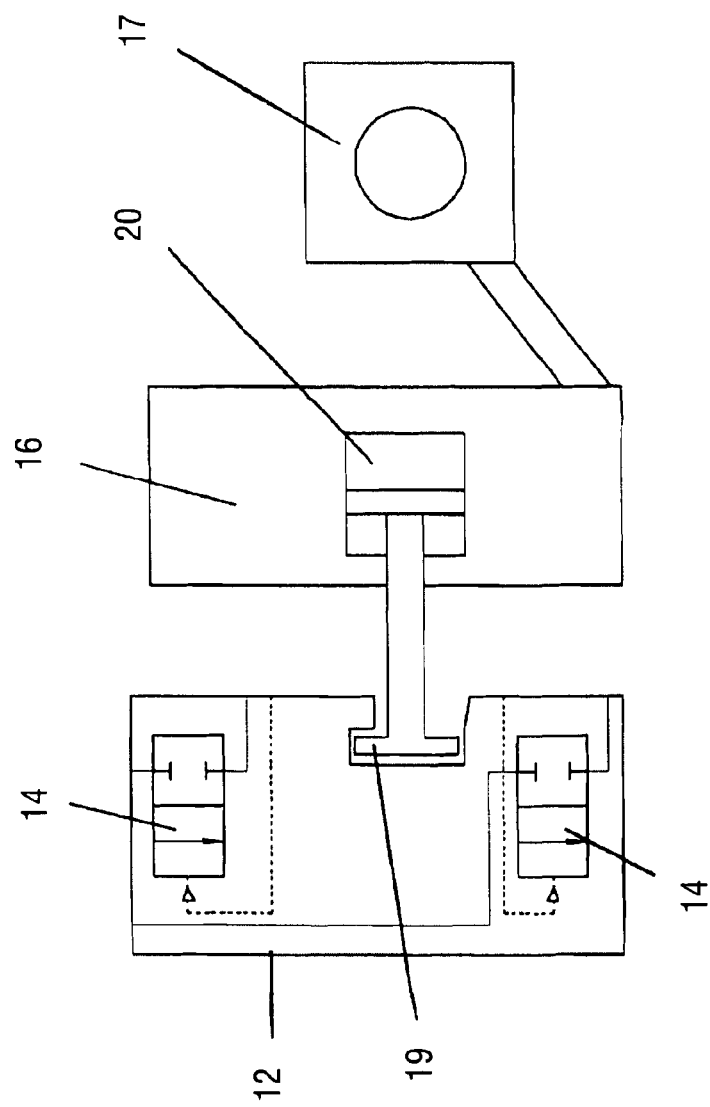
FIG. 5 shows a schematic view of the docking system in the painting robot according to an exemplary illustration.

It can be seen from FIGS. 4 and 5 that the color bar 12 has a groove 18 running in the direction of the arrow (FIGS. 2 and 3) between the two rows of docking points 15 provided in the example under consideration, an undercut being arranged on the upper side of said groove. A gripping disc 19, which is guided by the docking carriage 16 via a pneumatic cylinder 20, slides in the groove 18 in the mounted state. With the pneumatic cylinder 20 serving as the docking and clamping cylinder, the docking carriage and the color bar are displaceable transversely relative to one another. An electric motor drive or other drive could also be provided instead of the pneumatic cylinder 20.

In the docked state, the pneumatic cylinder 20 pulls the gripping disc 19 toward itself, so that the gripping disc 19 pulls the undercut of the groove 18 in the direction of the docking carriage 16, which leads to a mechanical clamping between the docking carriage 16 on the one hand and the color bar 12 on the other hand.

On the one hand, this mechanical clamping between the docking carriage 16 and the color bar 12 allows a largely leakage-free docking onto the docking points 15 of the color bar 12.

On the other hand, this type of mechanical clamping between the docking carriage 16 and the color bar 12 allows a docking without any external force, so that no complicated holders or supports are necessary in order to press the docking carriage 16 against the color bar 12.

By contrast, the pressure of the pneumatic cylinder 20 is released in the non-docked state in such a way that the gripping disc 19 can slide generally freely with play in the groove 18 so that the servo-pneumatic linear drive 17 can freely position the docking carriage 16 in the direction of the arrow in order to dock onto the desired docking point 15.

Figure 6B:
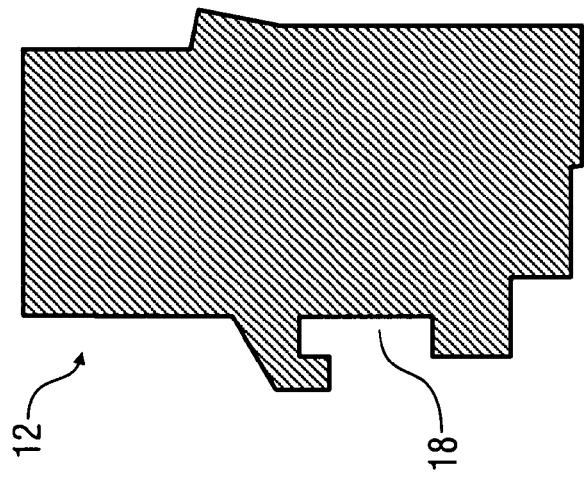
FIGS. 6A, 6B show schematic cross-sectional views of different designs of the color bar, according to an exemplary illustration.
Figure 6A:
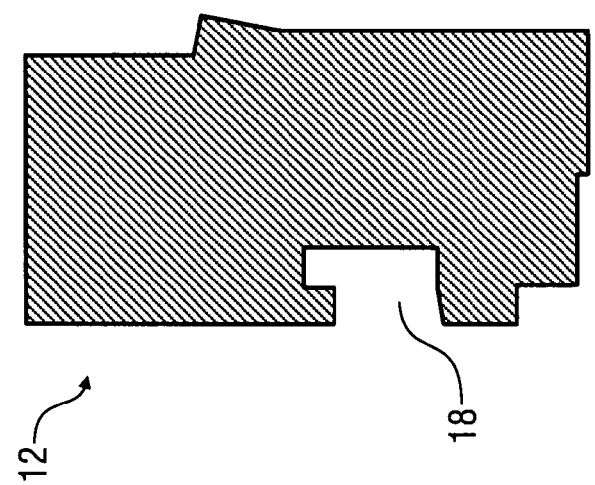

It can also be seen from FIGS. 4 and 6A that the groove 18 has an undercut only on its upper side, while the groove 18 has no undercut on its underside and even has a groove flank inclined downward at an angle. This configuration of the groove 18 is advantageous because paint that has escaped into the groove 18 due to a leakage can in this way simply flow off and can easily be removed.

FIG. 6B shows an alternative configuration of the groove 18, wherein the groove 18 is arranged outside the color bar 12.

In the illustrated example, the docking carriage 16 may be displaceable relative to the color bar 12 which is mounted in a stationary manner in the arm 5, but an inverse arrangement with a displaceable color bar is also conceivable.

One advantage of the structure of the color changer 8 is the extremely slim design, so that the distal robot arm 5 is likewise very slim despite the application technology arranged thereon. This is important because the distal robot arm 5 can in this way be easily inserted through body openings (e.g. window openings) into the motor vehicle body to be painted, in order to paint inner faces therein. Due to its slim design, the exemplary painting robot 1 is therefore suitable both for painting inner faces and for painting outer faces. This offers the possibility of using in a painting line just one single type of robot for painting the motor vehicle bodies, which means a considerable simplification.

FIGS. 2 and 3 show a connection block 21 in which the metering pump 10 for the stock paint and the paint pressure regulator 9 and also associated pressure sensors 33 may be integrated. The paint pressure regulator 9 may be installed directly and without any connecting tube on the metering pump 10. This integration of the metering pump 10 and of the paint pressure regulator 9 in the connection block 21 offers the advantage that disruptions between the paint pressure regulator 9 and the metering pump 10 which are caused by the tubes are omitted along with the tubes. In addition, the integration of the paint pressure regulator 9 and of the metering pump 10 in the connection block 21 brings the advantage of shorter connection lengths and also of a simple and compact structure. In FIG. 2, 21' denotes the second connection block for the two-component system mentioned above.

Figure 7:
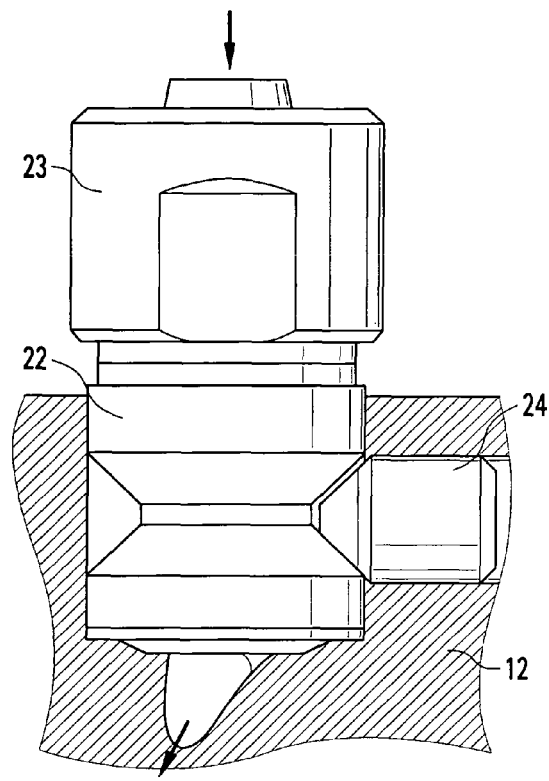
FIGS. 7 and 8 show connection of the individual color lines to the color changer, according to an exemplary illustration.
Figure 8:
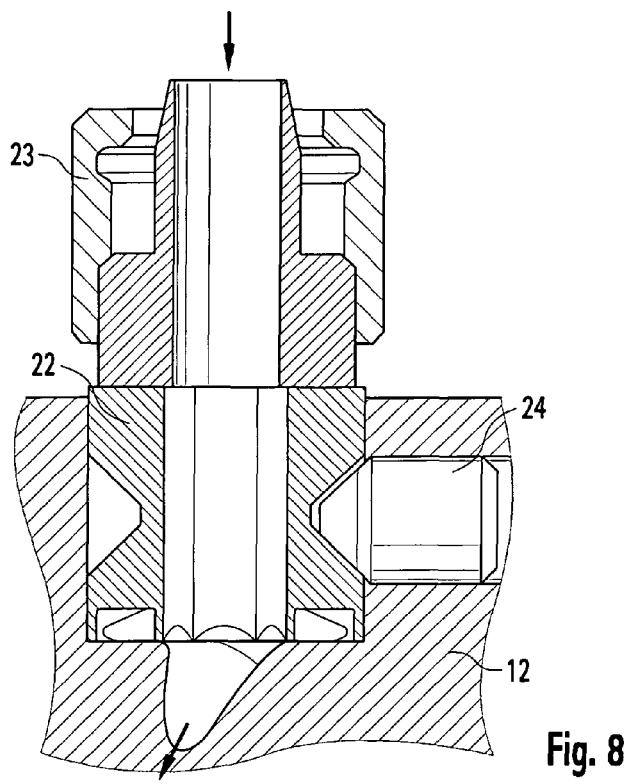

FIGS. 7 and 8 show an exemplary connection structure for connecting the color feed line 13 to the color bar 12. For instance, the individual color feed lines in each case have at their free end a plug-in nipple 22 with a union nut 23, wherein the plug-in nipple 22 for connection to the color bar 12 is inserted into a corresponding receiving bore in the color bar 12. In order to fix the plug-in nipple 22 and thus also the associated color feed line in the receiving bore of the color bar 12, the color bar 12 furthermore has a clamping bore which runs transversely, i.e. at a right angle or obliquely, to the receiving bore and opens into the receiving bore. In order to fix the plug-in nipple 22, a clamping screw 24 is screwed into this clamping bore until the clamping screw 24 butts with its conical tip against a correspondingly conically shaped clamping surface of the plug-in nipple 22. As the clamping screw 24 is screwed in further, the clamping screw 24 then clamps the plug-in nipple 22 in the receiving bore, as a result of which the plug-in nipple 22 and the associated color feed line is also fixed in the receiving bore.

The clamping screw 24 may in this case be designed e.g. as an Allen screw or the like so that, in order to connect the individual color feed lines 13, all that is required is an Allen key or the like which can be manipulated between the individual color feed lines 13 more easily than an open-ended wrench or a ring spanner. The individual connections of the color feed lines 13 to the color bar 12 can therefore be arranged at smaller distances from one another, as a result of which the necessary installation space is further reduced.

During the docking movement of the docking carriage 16 transversely to the color bar 12, which may be carried out by the pneumatic cylinder 20 (FIG. 5), it may be desirable to ensure that the docking inlet of the docking carriage 16 is precisely centered in relation to the docking opening 15 of the respectively approached color valve 14. To this end, there may be arranged on at least one of the two components 12, 16 one or more centering pins (not shown) which can engage in a bore on the respective other components. This positioning is designed for a certain degree of precision (e.g., 0.5 mm) which may be desirable, e.g., where the centering pins are not able to compensate any larger deviations (e.g. more than 0.5 mm) of the linear positioning by the e.g. servo-pneumatic linear drive 17 (FIG. 3) from the correct position. Deviations are possible since no sensor of the desired accuracy can or should be used in the measuring device provided for the positioning. For precise positioning, the linear drive 17 may be operated in a control loop, wherein nominal position values respectively stored for the individual colors are compared with the actual positions determined for example by the measuring device 32 (FIG. 2) and can be corrected in the event of deviations.

With this positioning, however, the problem may exist that the stored nominal position values do not always precisely coincide with the actual positions of the docking openings 15. The reason for these errors lies, for example, in tolerances during manufacture of the color change system or in tolerances of the measuring system. Tolerances which add to one another may arise for example during assembly of the color changer, e.g., in particular of the color bar 12 from individual modular segments (FIGS. 16-18). In addition to errors in the planar linear positioning, the actual docking position may also change due to static forces (e.g. depending on the angle of the robot arm) and acceleration forces of the robot movements. In the event of a nominal position value which does not precisely coincide with the actual position of the docking opening and correction of this error by the centering pins, the control system will still attempt after docking to approach the supposedly correct position corresponding to the nominal value. This may lead to a pressure build-up through the control loop up to the maximum pressure in the pneumatic cylinder of the linear drive so that, in the event of the subsequent undocking, the pneumatically pretensioned docking carriage suddenly jumps to the incorrect nominal position or overshoots the latter. The result would be an undesired mechanical stress on the centering pins and the associated bores.

In order to solve this problem, there are various possibilities according to the exemplary illustrations which can be implemented, for example, by software functions of the docking control system.

According to a first possibility, the undesired mechanical stresses can be avoided by the fact that, after docking, the control system reduces the pressure in the pneumatic cylinder to zero or to a sufficiently low value.

A second possibility lies in the fact that the control system carries over as the new nominal position the actual docking position measured after docking (at least within a predefined permissible tolerance) and thus the undesirable counter-control is avoided. This new nominal position may apply only until the subsequent undocking or else may also be stored as a future nominal position.

Another possibility is the statistical evaluation of the actual docking positions measured for the same color during an advantageous number (e.g. between three and fifty or even one hundred) respectively preceding docking processes, and the carrying-over of the average value calculated therefrom as the new nominal position. At least larger fluctuations and errors can be avoided as a result.

Furthermore, a mean position to be carried out as the nominal position may be calculated from determined upper and lower position limit values obtained as a result of the docked docking carriage being moved by the servo drive in both directions as far as the respective limit of the available movement play.

Further problems may occur in the position measuring system (measuring device 32). For instance, it may be the case that a position sensor used in the measuring system for the actual position of the docking carriage supplies different measured position values depending on its movement direction. This hysteresis problem of the sensor can be solved by the individual color valves 14 or the docking openings 15 thereof always being approached in the same direction. The direction of approach would otherwise be random and would depend on the direction in which the color valve to be approached next is located, which may be advantageous in other situations. Instead of this, in order to avoid the aforementioned hysteresis problem, the respective next color valve is approached directly in the same direction as the current color valve only when it lies in the same direction proceeding from a reference point (for example the first color valve). If, on the other hand, the next color valve lies between the current color valve and the reference point, the docking carriage with its docking inlet first moves back beyond the next color valve to a point (e.g. to the first color valve) from where it reaches this next color valve after a change in direction.

One alternative possibility lies in storing for each docking position not just one nominal value as in the normal case but rather a respective nominal value for each of the two possible directions of approach, said value then being used in a manner depending on the direction of travel of the docking carriage.

Another potential problem of the position measuring system may be a linearity of the sensor behavior, i.e. of the measured value as a function of the docking carriage travel, which is not sufficient for the necessary position accuracy. Similar problems may be based on aging of the sensor or on wear or temperature faults of the measuring device. These and other problems can be solved by individual referencing, wherein, in order to create the control program, each color position is approached individually by hand and then the relevant actual position is stored, so that the accuracy depends only on the reproducibility (which is extremely precise per se). As an alternative possibility, it would be somewhat less complicated to approach manually or automatically only a first docking point, to record the actual position and then to move the docking carriage from there automatically over the distance known to the system to the next docking point, then to the next docking point, etc. For each docking point, with the pneumatic cylinder in the pressureless state, the measured position thereof is stored as the nominal value until the complete table of all positions is available. Since the distances between the docking points are small, correspondingly small linearity errors are obtained.

When creating the table of the nominal position values, it may be convenient to carry out various checks with regard to correctness and completeness. On the one hand it is checked that the positions for two different colors cannot be ascertained and programmed (learned) in a given distance range in which only the docking opening of the color valve of a single color can be located. It is also checked that in each case between the two detected color positions the intended distance is maintained within a given tolerance limit in order to prevent the system from skipping a color position for example when ascertaining the nominal values. It can then also advantageously be checked that the color positions are "learned" in the logical sequence of the colors (1, 2, 3, . . . ).

The positioning and programming according to the exemplary illustrations is also suitable for other docking color changers including rotary color changers with rotatable docking inlets, and is also not necessarily limited to robots suitable for interior and exterior painting.

FIGS. 9A to 9D show different operating states of the exemplary painting robot 1 in the context of a so-called "push-out mode", wherein the different operating states are shown in FIG. 10 in the form of a flowchart.

A normal painting mode will first be described below with reference to FIG. 9A.

Figure 9A:
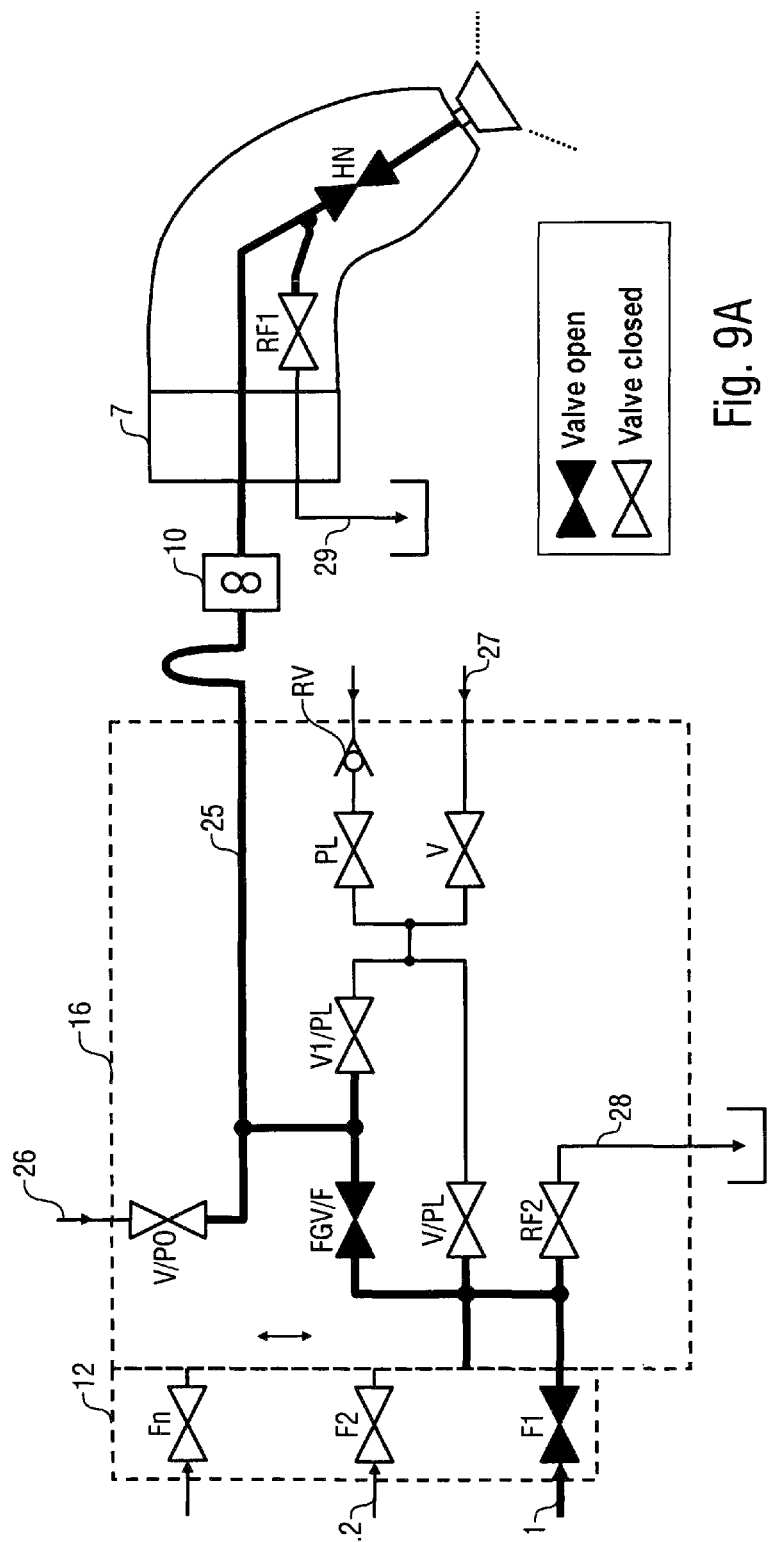
FIGS. 9A-9D show different operating states of the exemplary painting robot in the context of the so-called "push-out mode"

In the normal painting mode shown in FIG. 9A, the docking carriage 16 is docked onto the color bar 12 by means of a first docking inlet and a paint having the desired color is extracted from the color bar 12 via a color feed line 13.1 and a color valve F1.

The paint extracted from the color bar 12 may then be passed via a separating valve FGV/F into a common color line 25, wherein the common color line 25 leads via the metering pump 10 to the rotary atomizer 7 which applies the supplied paint when the main needle valve HN is open.

Figure 9B:
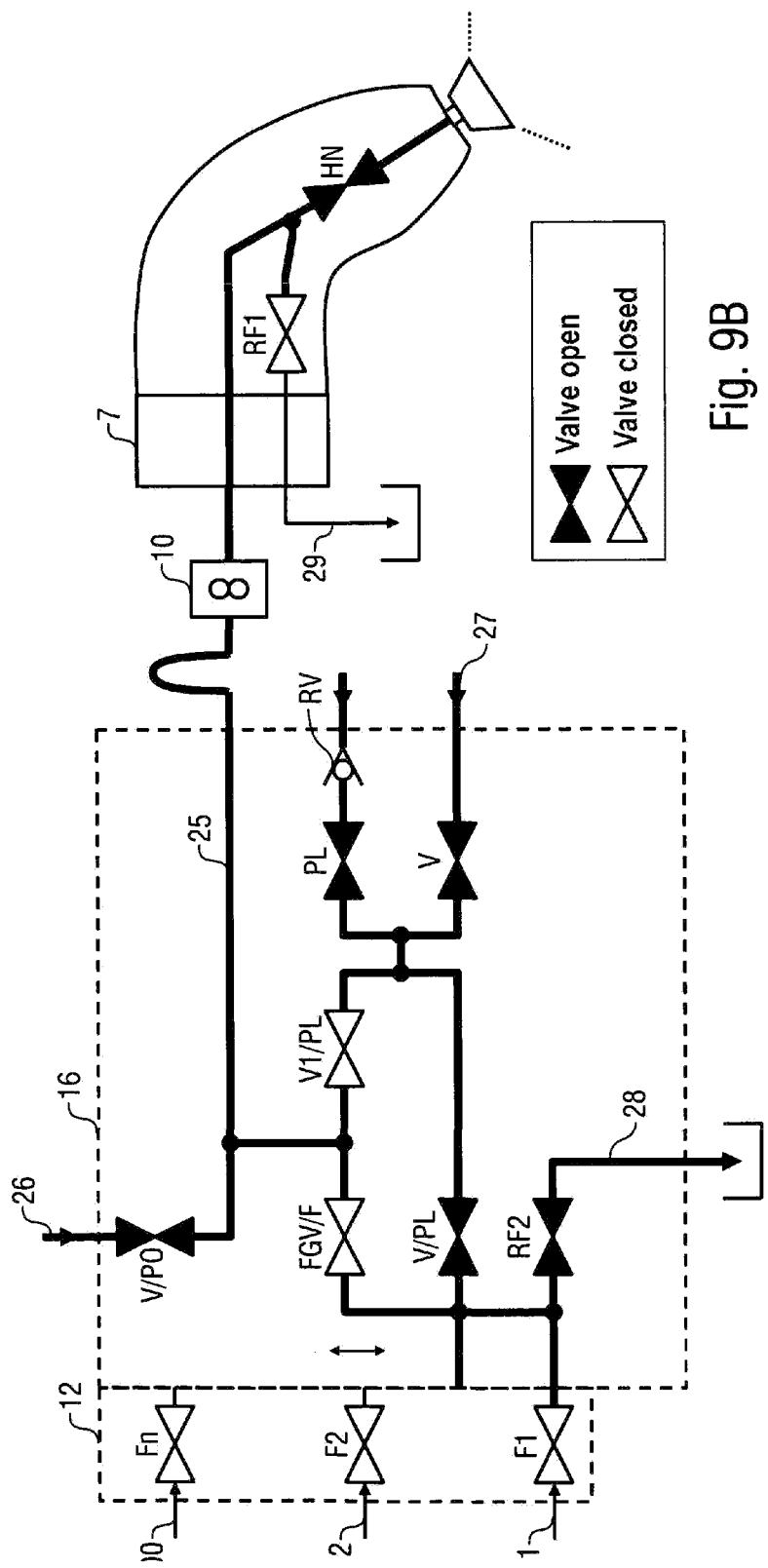

The operating state of the painting robot shown in FIG. 9B will now be described below.

Firstly, in this operating state, the paint located in the common color line 25 is pushed out of the common color line 25, for which reason this operating state is also known as the "push-out mode". In this operating state, the color valve F1 is closed, so that the color bar 12 does not dispense any paint to the docking carriage 16.

Instead, a flushing agent (e.g., a thinner for the paint used) is introduced via a flushing agent feed line 26 and a flushing agent valve V/PO into the common color line 25, wherein the flushing agent serves as a displacement medium and pushes the paint remaining in the common color line 25 out of the common color line 25 via the rotary atomizer 7. In this case, the paint pushed out via the rotary atomizer 7 can at first still be used for painting, but the painting mode must be adjusted in good time before the flushing agent introduced via the flushing agent feed line 26 exits from the rotary atomizer 7.

In this operating state, the separating valve FGV/F is closed and thus separates the common color line 25 from the docking point on the color bar 12, which allows a flushing of the docking point.

To this end, flushing agent is introduced into the docking carriage 16 via a flushing agent feed line 27 and a flushing agent valve V, wherein the flushing agent reaches as far as the docking points on the color bar 12 and thus flushes said docking points. Finally, the introduced flushing agent is then fed back via a return valve RF2 and a return line 28.

In this example, therefore, two separate flushing circuits may be provided which allow a simultaneous flushing of the common color line 25 and of the docking points.

The first flushing circuit leads from the flushing agent feed line 27 via the flushing agent valve V and the valve V/PL to the docking points of the color bar 12 and finally via the return valve RF2 into the return line 28.

By contrast, the second flushing circuit leads from the flushing agent feed line 26 via the flushing agent valve V/PO into the common color line 25, from where the first flushing circuit runs via the metering pump 10 into the rotary atomizer 7 and through the main needle valve HN.

Furthermore, in this operating state, pulsed air is introduced via a non-return valve RV and a pulsed air valve PL in order to improve the flushing effect.

As shown in the flowchart in FIG. 10 (to the right next to "FIG. 9B"), the docking interface is not flushed before or after the line leading through the atomizer but rather in parallel therewith, that is to say simultaneously, in order to avoid delays in operation.

Figure 9C:
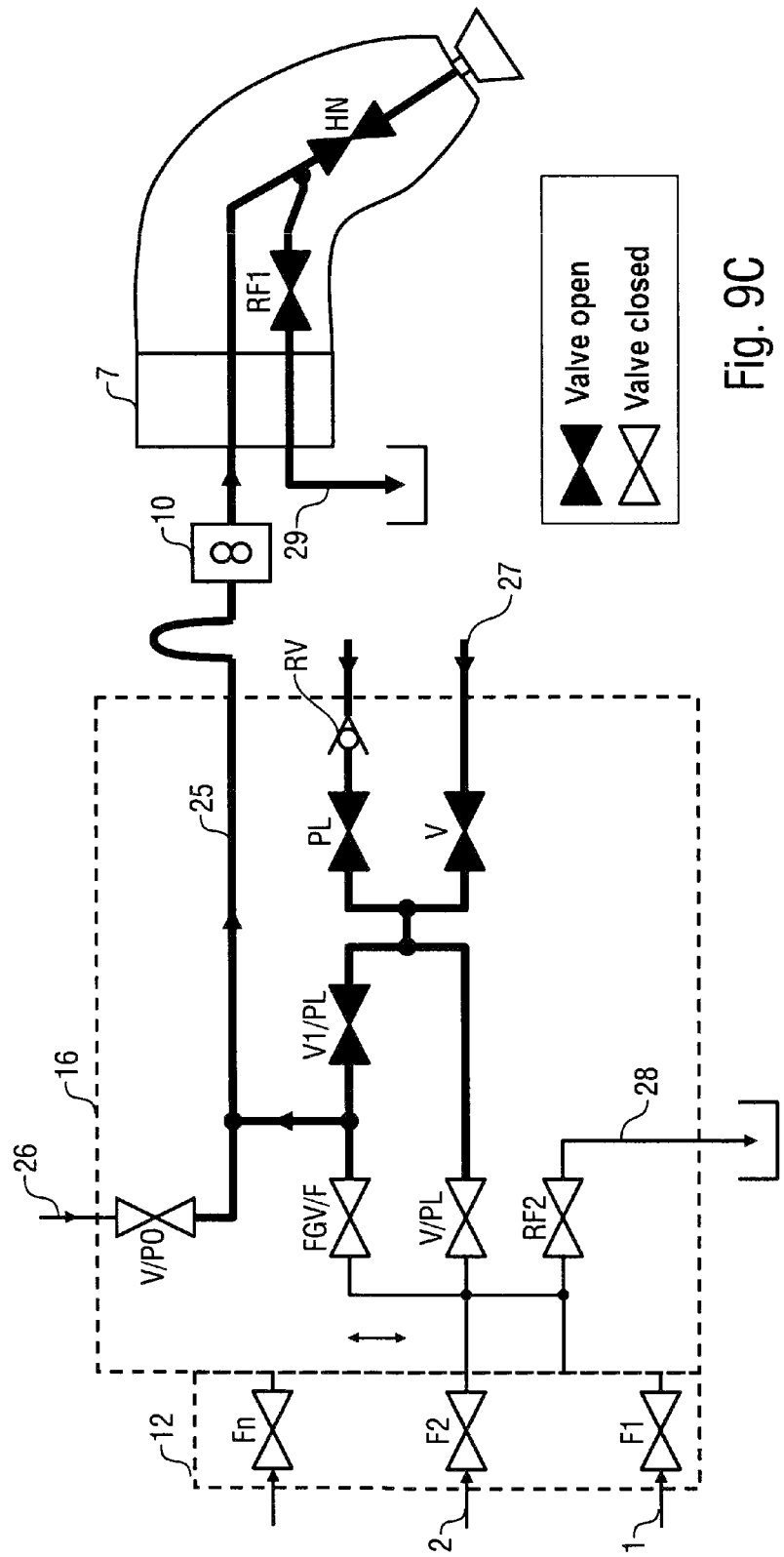

The operating state shown in FIG. 9C will now be explained below.

On the one hand, as is shown and after a corresponding displacement, the docking carriage 16 in this operating state docks with a second docking inlet (instead of with its first docking inlet as in FIGS. 9A and 9B) onto another docking point of the color bar 12 in order to extract a differently colored paint. To this end, the docking carriage 16 is displaced by the servo-pneumatic linear drive 17 relative to the color bar 12 in the direction of the arrow, wherein the docking carriage 16 in the drawing docks onto the docking point of a color valve F2 which is supplied with a paint of a given color via a color feed line 13.2.

On the other hand, a flushing of the rotary atomizer 7 and of the metering pump 10 takes place in this operating state. To this end, flushing agent is introduced via the flushing agent feed line 27 and the flushing agent valve V, said flushing agent passing via an open valve V1/PL and the likewise open color valve into the common color line 25. From there, the introduced flushing agent reaches the rotary atomizer 7 and is then returned via the main needle valve HN and a return valve RF1, which is arranged in the rotary atomizer 7, and a return line 29.

Furthermore, in this operating state, pulsed air is introduced via the non-return valve RV and the pulsed air valve PL in order to improve the flushing effect.

Figure 9D:
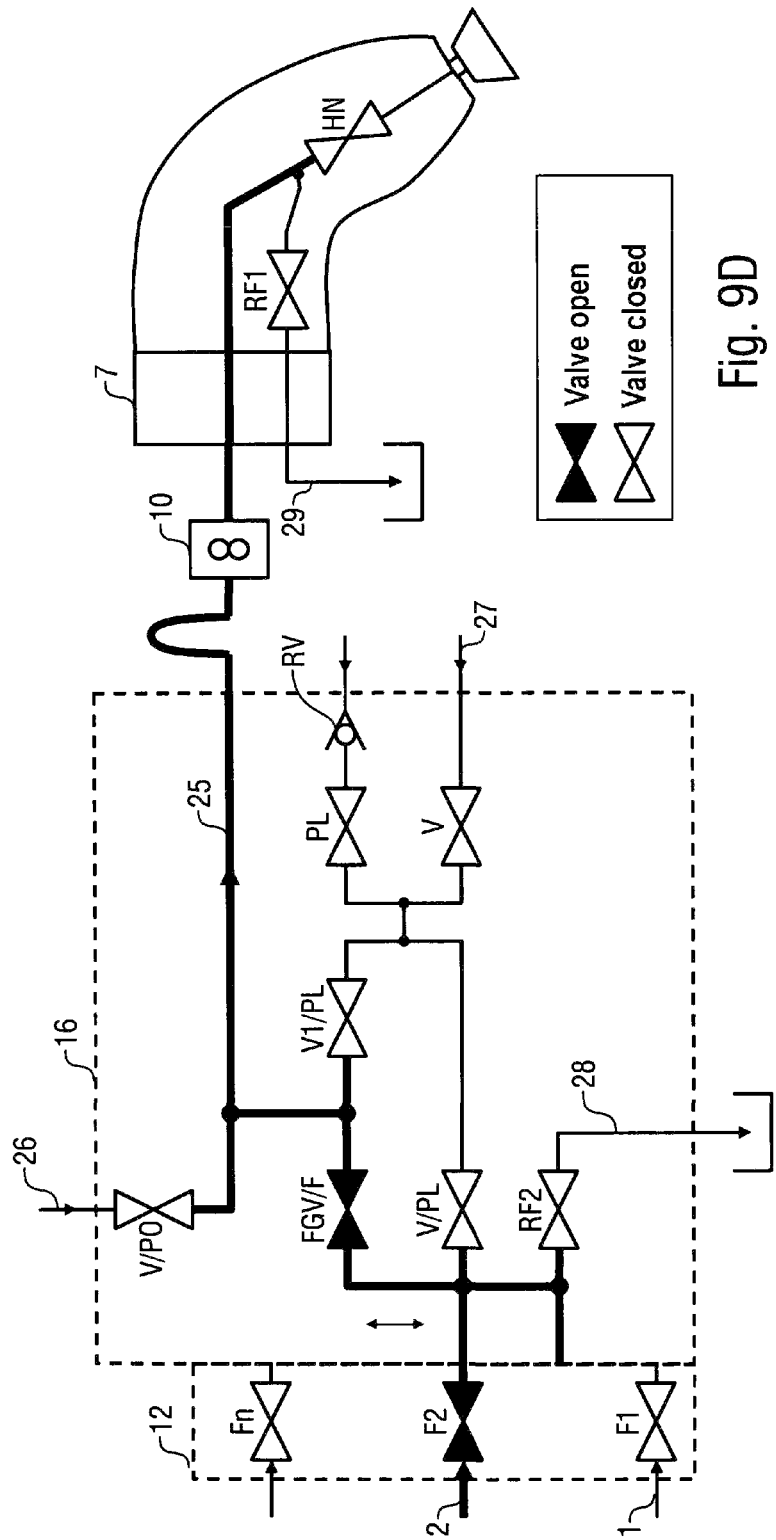

The operating state of the painting robot 1 shown in FIG. 9D will now be explained, in which the new paint is supplied. In this case, the desired paint reaches the rotary atomizer 7 from the color feed line 13.2 via the open color valve F2 and the open separating valve FGV/F, the main needle valve HN initially still being closed. At the end of this operating state, the rotary atomizer 7 is then able to apply the new paint.

FIGS. 11A to 11E show different operating states in a modified example of embodiment of the painting robot which allows a so-called "reflow mode", in which the paint remaining in the common color line 25 in the event of a color change is pushed back into the associated color feed line 13.1 or 13.2 in order to allow reuse.

The operating state shown in FIG. 11A will first be explained below, which may be associated with operation during a normal painting mode. In this operating state, paint passes via the color feed line 13.1, the color valve F1, a first docking inlet of the docking carriage 16, the separating valve FGV/F and the common color line 25 to the rotary atomizer 7, which applies the supplied paint when the main needle valve HN is open.

Figure 11B:
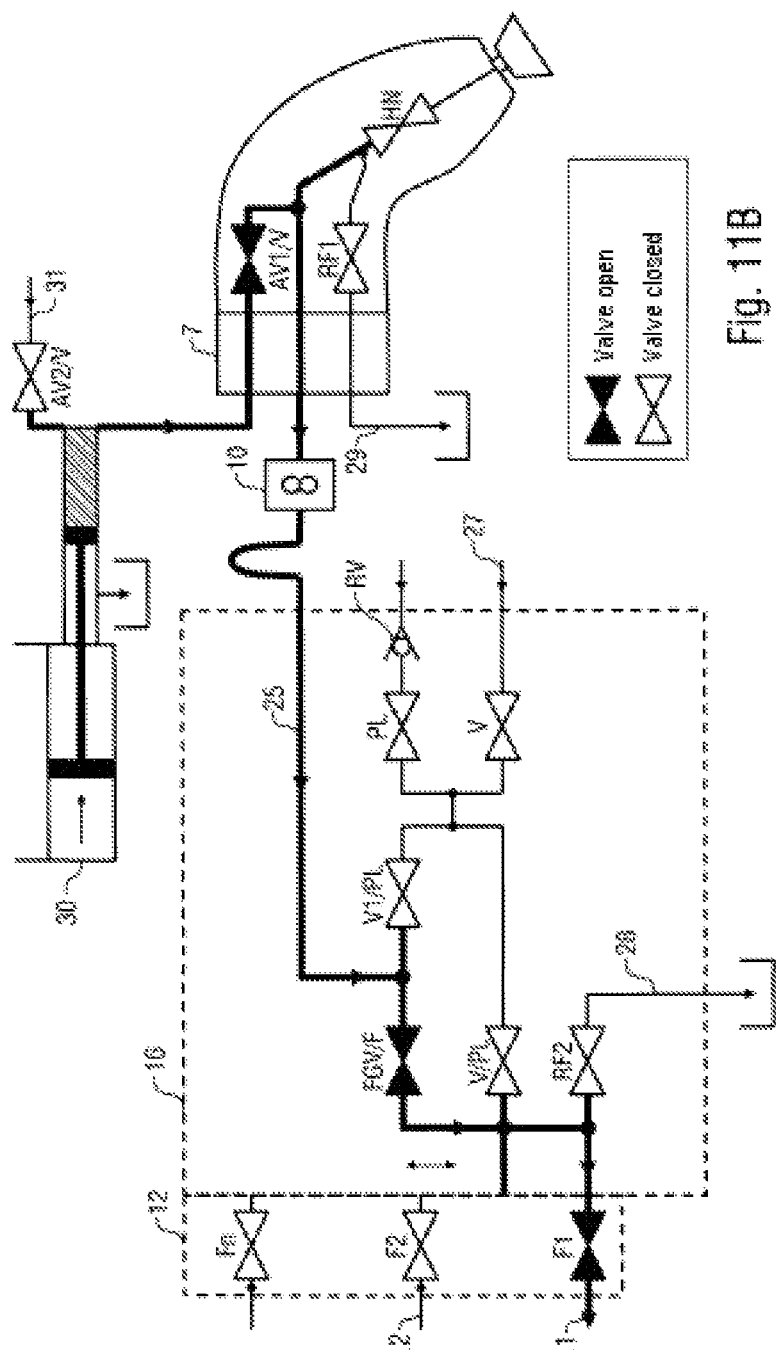

The operating state shown in FIG. 11B will now be explained, in which the paint located in the common color line 25 between the color changer 8 and the rotary atomizer 7 in the event of a color change is pushed back into the associated color feed line 13.1.

To this end, use is made of a flushing agent metering means 30 in the form of the illustrated reflow cylinder, which can be filled with flushing agent on the inlet side via a flushing agent feed line 31 and a flushing agent valve AV2/V. As described above, a "metering means" may include a device intended to convey a predefined volume of liquid (dose) but, in contrast to the metering pumps used for coating material, does not have to produce a defined volume flow per unit of time.

On the outlet side, the flushing agent metering means 30 is connected to the common color line 25 via a flushing agent valve AV1/V in the rotary atomizer 7 upstream of the main needle valve HN.

In the so-called "reflow mode", the flushing agent metering means 30 pushes the flushing agent located therein via the flushing agent valve AV1/V into the common color line 25, wherein the flushing agent introduced serves as a displacement medium and pushes back into the associated color feed line 13.1, via the separating valve FGV/F and the color valve F1, the paint located in the common color line 25, which allows a subsequent reuse of the paint that has been pushed back.

Figure 11C:
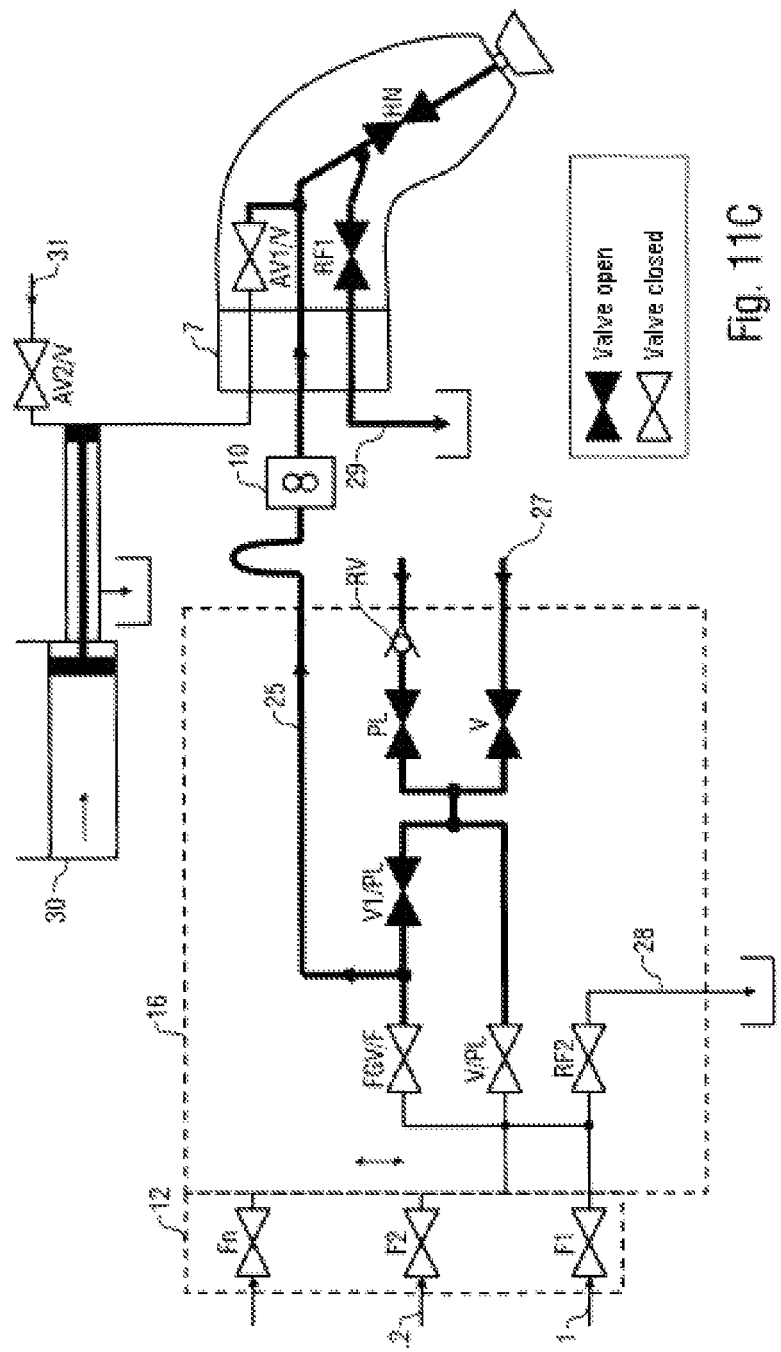

The operating state shown in FIG. 11C will now be explained below, in which the metering pump 10 and the rotary atomizer 7 are flushed.

To this end, flushing agent is introduced from the flushing agent feed line 27 via the flushing agent valve V and the valve V1/PL into the common color line 25, wherein the flushing agent passes via the main needle valve HN of the rotary atomizer 7 and the return valve RF1 into the return line 29. Furthermore, in this operating state, pulsed air is introduced via the non-return valve RV and the pulsed air valve PL in order to improve the flushing effect.

Figure 11D:
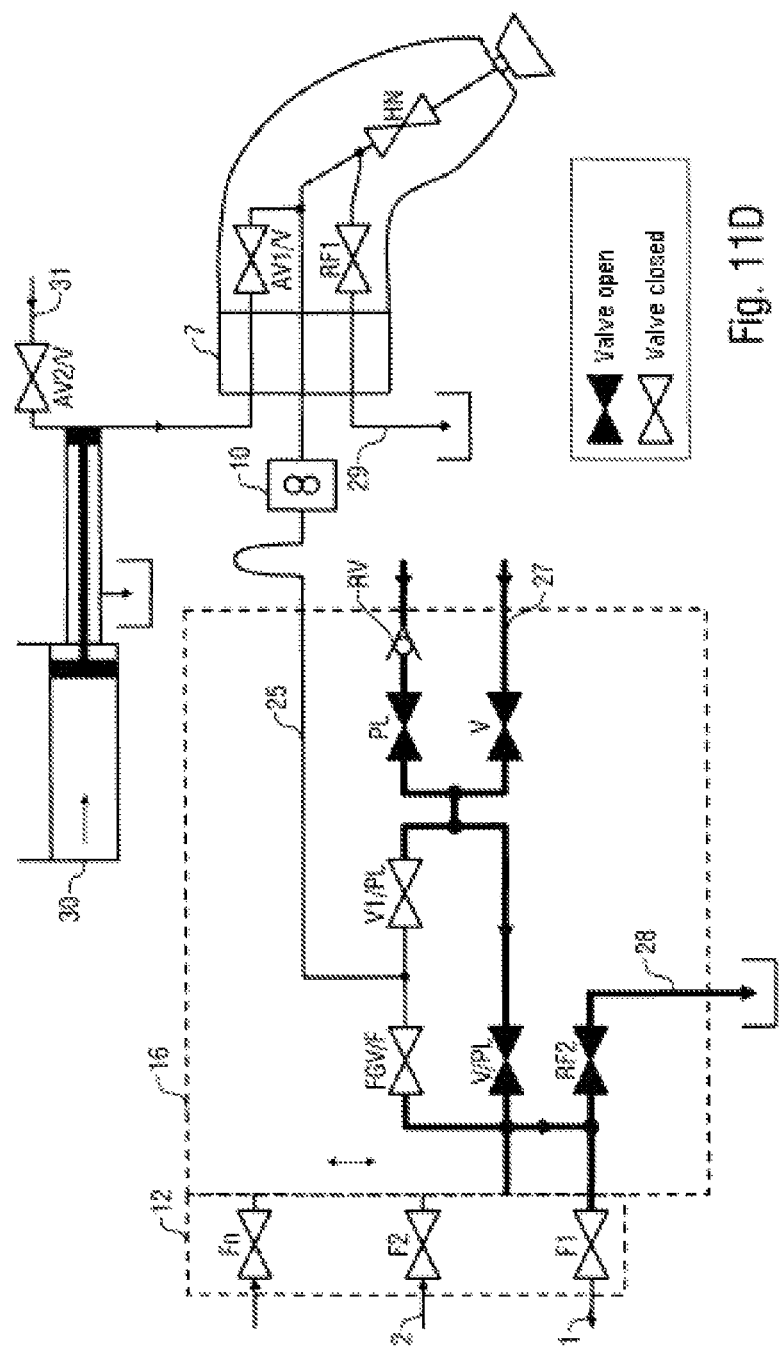

The operating state shown in FIG. 11D will now be explained below, in which the docking carriage 16 is flushed as far as the docking points on the color bar 12.

To this end, flushing agent may be introduced from the flushing agent feed line 27 via the flushing agent valve V and the valve V/PL, said flushing agent reaching as far as the docking points of the color bar 12 and thus flushing the latter. The introduced flushing agent is then passed via the return valve RF2 into the return line 28.

Furthermore, also during the flushing of the docking carriage 16, pulsed air is introduced via the non-return valve RV and the pulsed air valve PL in order to improve the flushing effect.

Figure 11E:
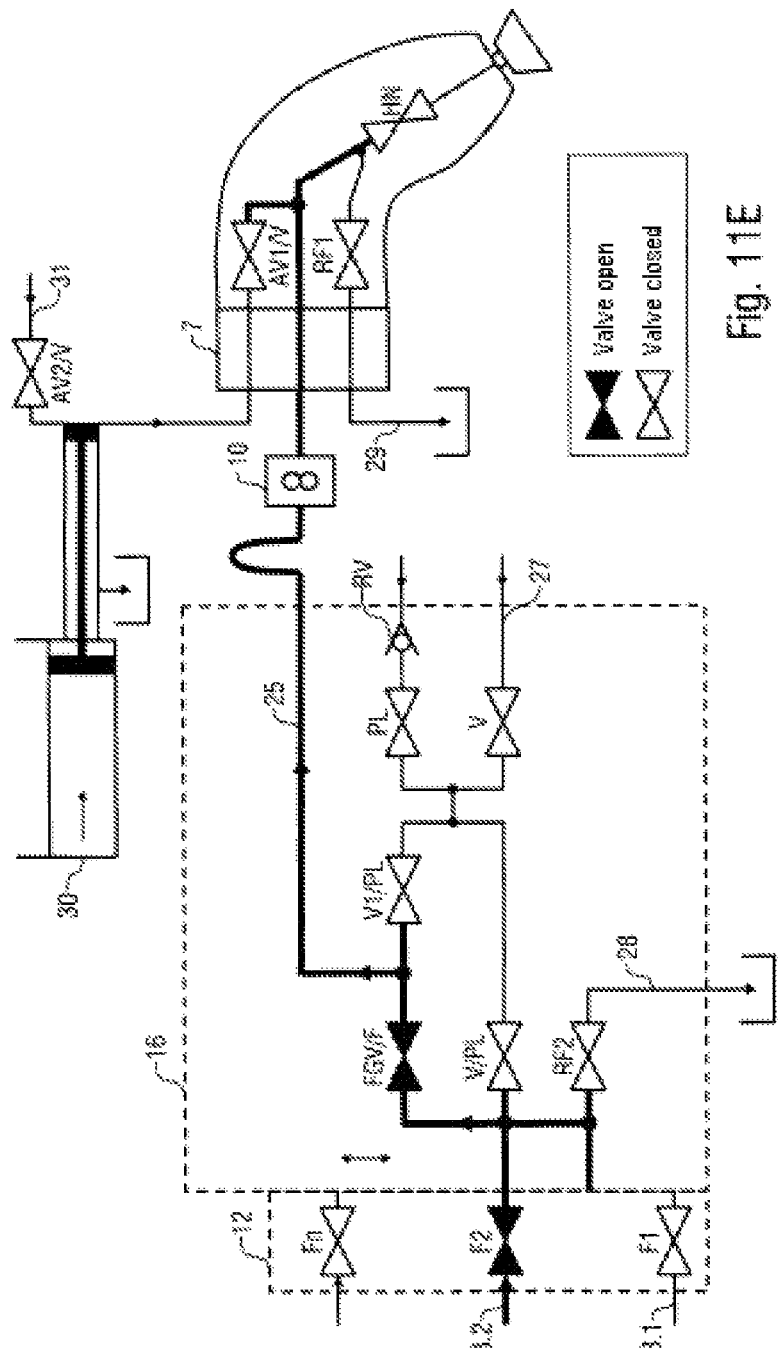

The operating state shown in FIG. 11E will now be explained below.

On the one hand, as is shown and after a corresponding displacement, the docking carriage 16 in this operating state docks with its second docking inlet (instead of the aforementioned first docking inlet) onto another docking point of the color bar 12 in order to extract a paint having a different color.

On the other hand, the new paint is pushed in this operating state. Here, the paint passes from the color feed line 13.2 via the color valve F2 and the separating valve FGV/F to the rotary atomizer 7, where the new paint is then available at the main needle valve HN, which is initially still closed. Following this supply of the new paint, the rotary atomizer 7 can then apply the new paint.

For a further time saving during a color change, the valve systems described above (FIGS. 9-12) for the push-out and reflow modes can be expanded to an A/B system in which two separate color lines lead in parallel from the docking carriage 16 into the atomizer 7.

The main details of the A/B push-out system can be seen in the drawings starting from FIG. 13A. Accordingly, the docking carriage 16, which can be displaced along the color bar 12 comprising the color valves F1, F2, etc., may have two docking inlets 40 and 41 which can be selectively connected to color valves of the color bar 12 and of which only one or the other is connected to one of the color valves in the color bar 12 depending on the position of the docking carriage, while the respective other docking inlet may be sealed off for example by the color bar (as in the examples shown in FIGS. 9-12). The four illustrated valves, namely the return valve RLF, the color valve LFA of the A-branch, the color valve LFB of the B-branch and the flushing valve LSV, may be connected in parallel with one another to the two docking inlets in the docking carriage 16. From the color valve LFA, the color line 25A of the A-branch leads via the metering pump 10A into the atomizer 7 and therein to a color valve FA arranged within the atomizer upstream of the main needle valve HN. In parallel therewith, the color line 25B of the B-branch leads from the color valve LFB via the metering pump 10B into the atomizer and therein to a color valve FB arranged within the atomizer upstream of the main needle valve HN and parallel to the valve FA.

The docking carriage 16 furthermore may contain the two illustrated push-out valves LPOA and LPOB, of which the valve LPOA is connected within the docking carriage to the line 25A leading from the valve LFA to the metering pump 10A and similarly the valve LPOB is connected to the line 25B. At their respective inlet, the valves LPOA and LPOB are connected to a line 26PO leading into the docking carriage for flushing agent (thinner) which serves as the pushing agent for the push-out mode. In addition, the docking carriage contains the two illustrated flushing valves LVPLA and LVPLB, of which, in a manner similar to the valves POA and POB, one is connected to the line 25A and the other is connected to the line 25B, and which are connected on the inlet side via the line 26V/PL to the external valves V and PL for flushing agent (thinner) and pulsed air.

Located in the atomizer 7 are further valves PL' and V for pulsed air and thinner which are connected upstream of the main needle valve HN in parallel with the aforementioned valves FA and FB and can be supplied on the inlet side by corresponding lines (not shown) which lead into the atomizer. Furthermore, the atomizer contains the two illustrated return valves RFA and RFB which, as is shown, are connected between the inlet side of the valve FA and FB respectively and the return line 29 common to said valves.

In the operating state shown in FIG. 13B, in which (only) the valves F1, LFA, FA and HN are open and the docking inlet 40 of the docking carriage 16 is docked onto the valve F1 of the color bar 12, the relevant paint flows through these valves into the bell cup of the atomizer 7. Painting therefore may generally take place through the A-branch.

Figure 13C:
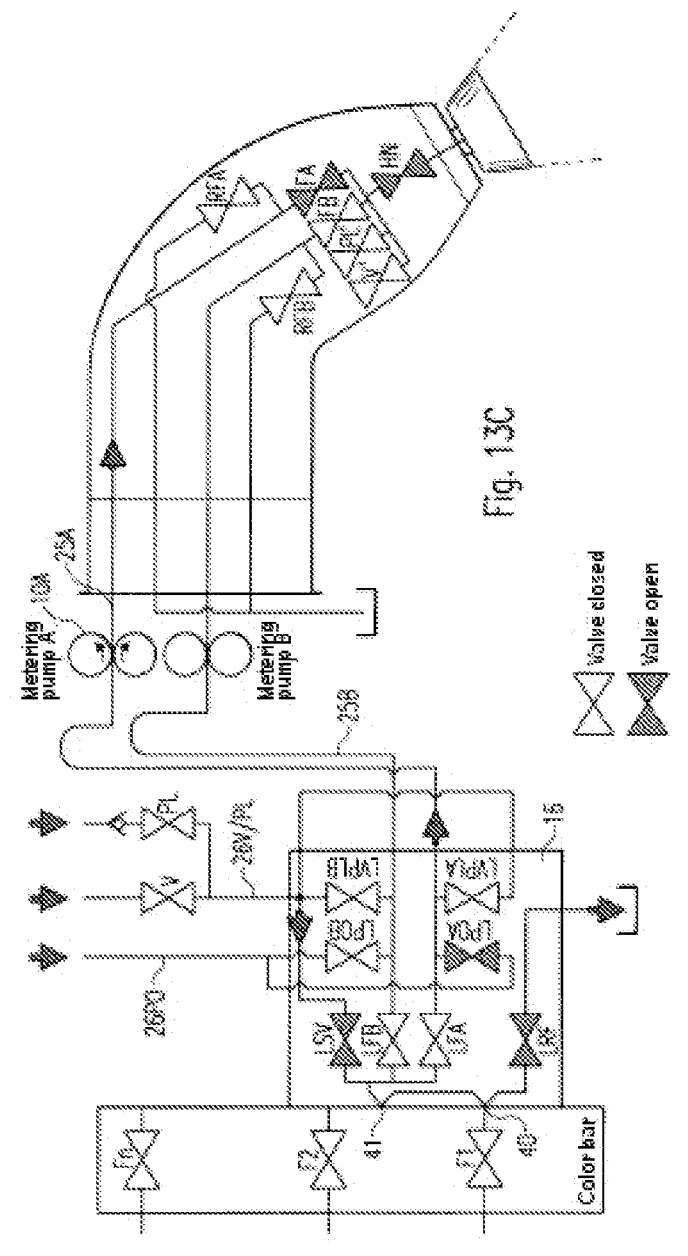

In the operating state shown in FIG. 13C, (only) the valves LSV, LRF, POA, V, PL and also the valves FA and HN are open, while the previously docked color valve LFA is now blocked. In this operating state, residual paint still located in the line 25A is pushed toward the metering pump 10A by the pushing agent (thinner) from the line 26PO via the open valve POA and is conveyed by said metering pump into the bell cup in order to be used for the final painting according to the push-out principle known per se. This operating state lasts until the residual quantity of paint (precisely determined beforehand in terms of quantity and time) is consumed. In parallel with this and at the same time, the interface of the docking carriage 16 with the two docking inlets 40 and 41 is flushed with the flushing agent coming from the line 26V/PL, i.e. with thinner and pulsed air. The flushing agent can flow off through the open return valve LRF.

In the operating state shown in FIG. 13D, the flushing process is ended (valves LSV and LRF closed), while the push-out mode through the A-branch is continued and at the same time the docking carriage 16 is pushed with its second docking inlet 41 onto the color valve F2 of the color bar 12.

Also in the operating state shown in FIG. 13E, the push-out mode using the color from the color valve F1 through the A-branch is continued. In parallel with this and at the same time, however, the next color may already be supplied via the inlet 41 docked onto the color valve F2 for the next color through the open valve LFB through the B-branch, i.e. the line 25B and the metering pump 10B, until it reaches the color valve FB of the atomizer, which is still closed, wherein the line can be vented via the valve RFB.

Figure 13F:
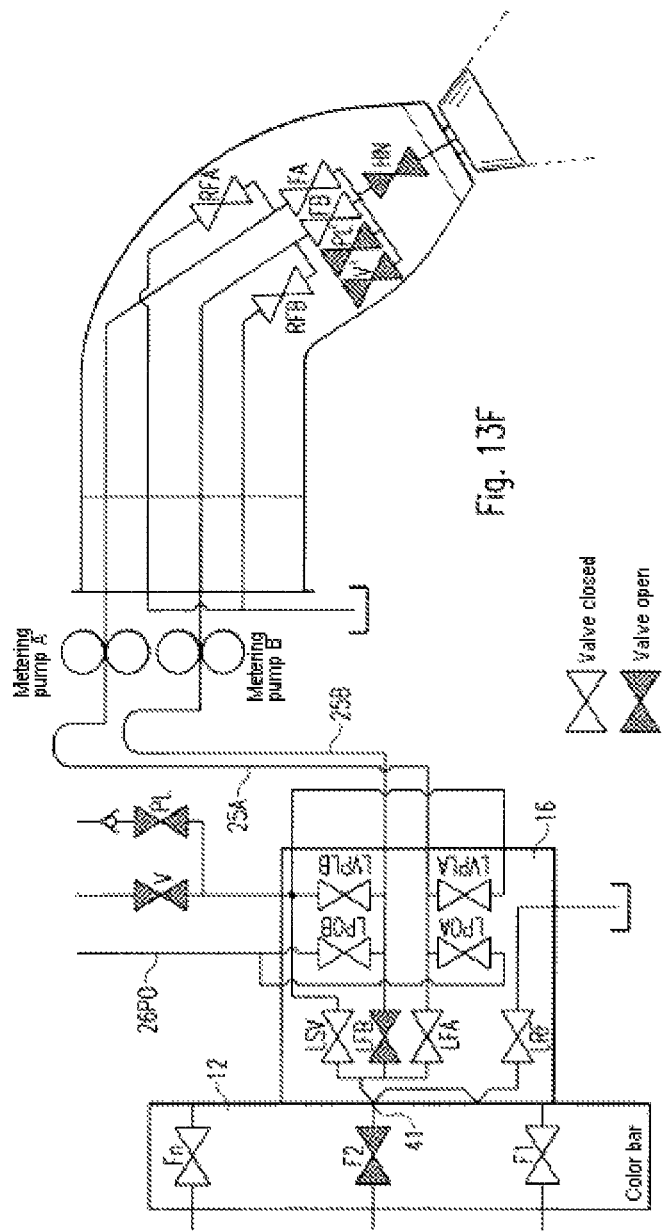

In the operating state shown in FIG. 13F, the push-out mode is ended (valve POA closed) so that the atomizer with its bell cup can be flushed via its open valves V' and PL' and the main needle valve HN.

In the operating state shown in FIG. 13G, painting takes place with the new color through the B-branch and the color valve FB of the atomizer, which is now open, while in parallel therewith and at the same time via the open valve LVPLA the line 25A including the metering pump 10A as far as the closed color valve FA of the atomizer is flushed with the flushing agent coming from the line 26V/PL, which flows off through the open return valve RFA. Consequently, the A-branch is now immediately available again for the next color.

Figure 13H:
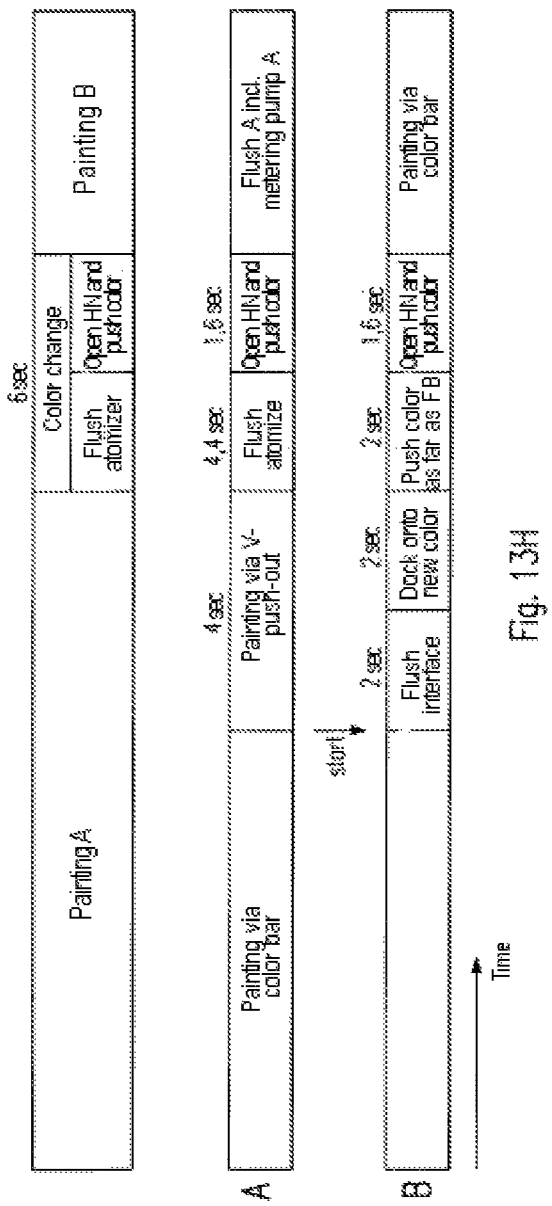

FIG. 13H shows a typical example of the temporal sequence of the described push-out A/B mode. At "start", the push-out mode in the A-branch described with reference to FIG. 13C, etc. and the simultaneous flushing of the interface of the docking carriage begin. As can be seen from this figure, the color change time in the example under consideration is only approximately 6 seconds.

Further details of the A/B reflow system can be seen in the drawings starting from FIG. 14A. With regard to the arrangement of the valves LRF, LFA, LFB, LSV, V and PL and also LVPLA and LVPLB in the docking carriage 16, the metering pumps 10A and 10B and the valves FA, FB, PL', V' and also RFA and RFB located in the atomizer 7, the reflow system can correspond to the A/B push-out system. The same applies to other details.

By contrast, naturally the valves POA and POB of the push-out system are omitted, while on the other hand the additional reflow valve $V_{Reflow}$ may be arranged upstream of the main needle valve HN in parallel with the valves FA to V' in the atomizer and may be arranged for example outside the atomizer in the robot arm of the reflow cylinder or flushing agent metering means 30 having the flushing agent valves AV2/V already described in the examples of embodiments shown in FIG. 11A, etc. The flushing agent metering means 30 is connected to the reflow valve $R_{Reflow}$ via the reflow line LR.

Figure 14B:
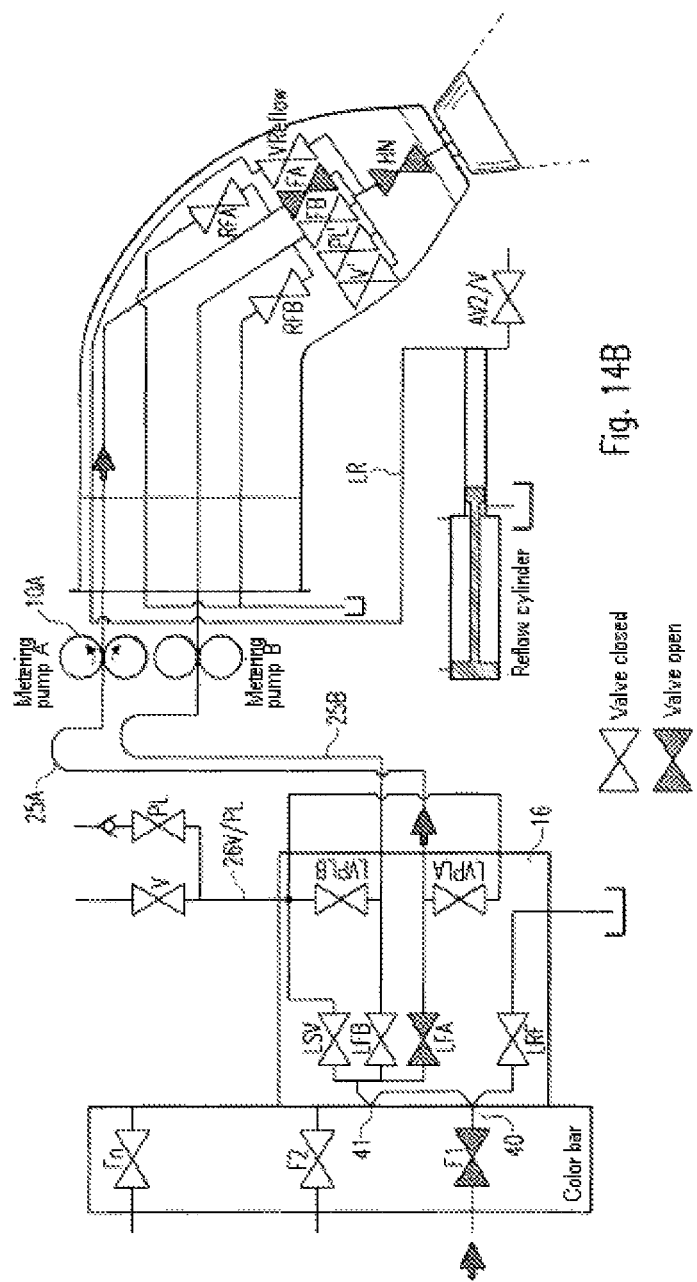

In the operating state shown in FIG. 14B, in which (only) the valves F1, LFA, FA and HN are open, painting takes place as in FIG. 13B using the paint flowing out of the color valve F1 in the A-branch.

Figure 14C:
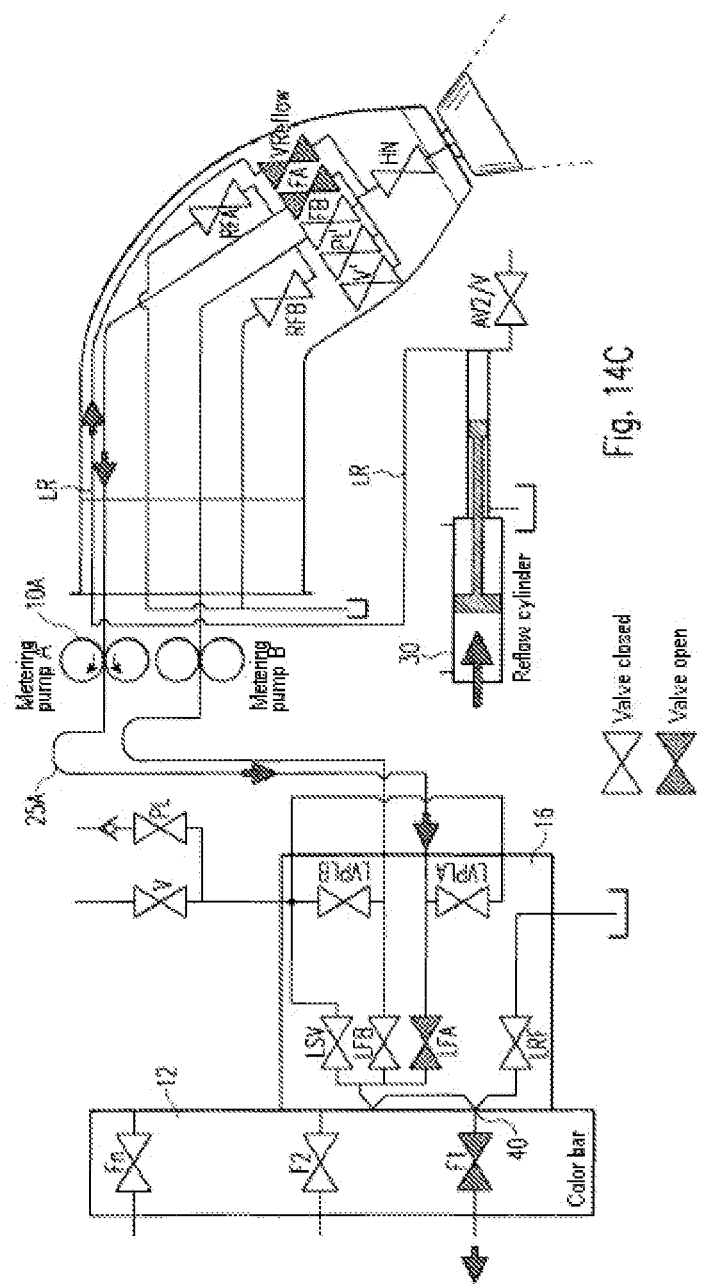

In the operating state shown in FIG. 14C, the painting mode is ended by closing the main needle valve HN, and the reflow valve $V_{Reflow}$ is opened while the valve FA is still open. With the flushing agent (thinner) serving as the reflow pushing means, the flushing agent metering means 30 pushes the paint still located in the line 25A back through the valve FA to the metering pump 25A, which conveys the paint with the opposite direction of rotation through the open valves LFA and F1 back into the color supply system (reflow).

Figure 14D:
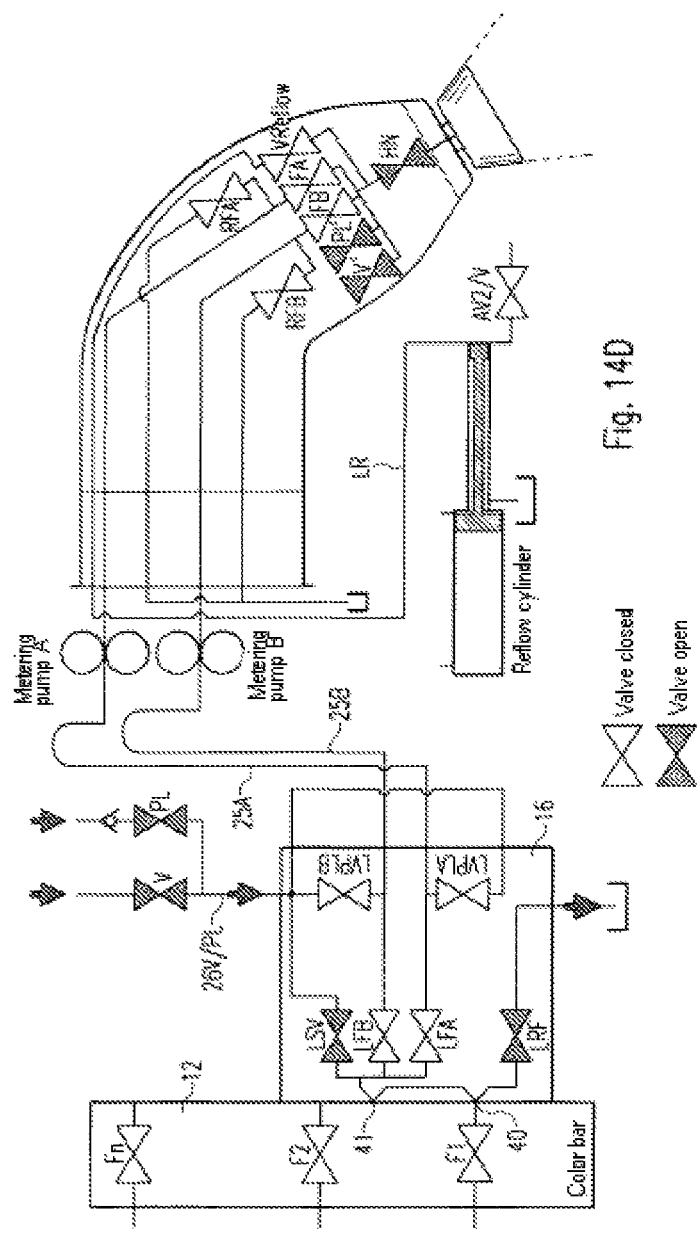

As soon as reflow through the color valve F1 of the color bar 12 is ended and this valve is closed again, the interfaces of the docking carriage 16 comprising the docking inlets 40 and 41 can be flushed as shown in FIG. 14D via the open valves LSV and LRF, while at the same time the bell cup can be flushed via the valves V' and PL' of the atomizer and via the main needle valve HN.

Now, as shown in FIG. 14E, by displacing the docking carriage 16, the second docking inlet 41 thereof is connected to the color valve F2 for the next color. In parallel with this and at the same time, while the flushing of the bell cup continues, the color line 25A of the atomizer can be flushed, namely with the thinner coming through the open valve LVPLA and conveyed by the metering pump 10A, said thinner then flowing off through the open return valve RFA and the line 29.

Figure 14F:
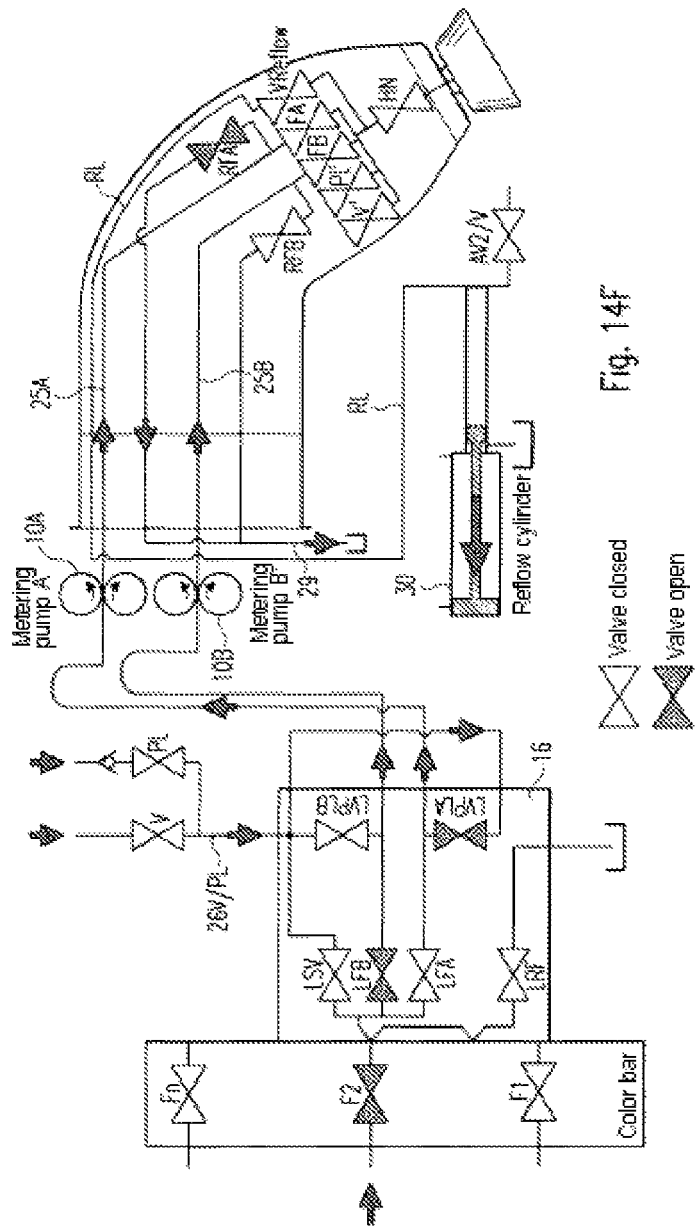

Still during the flushing of the line 25A and as shown in FIG. 14F, the new color is supplied from the color valve F2 through the valve LFB into the line 25B and to just before the color valve FB of the atomizer, wherein, in a manner similar to FIG. 13E, ventilation through the valve RFB is possible. At the same time, the reflow cylinder of the flushing agent metering means 30 can be topped up through the valve AV2/V.

Figure 14G:
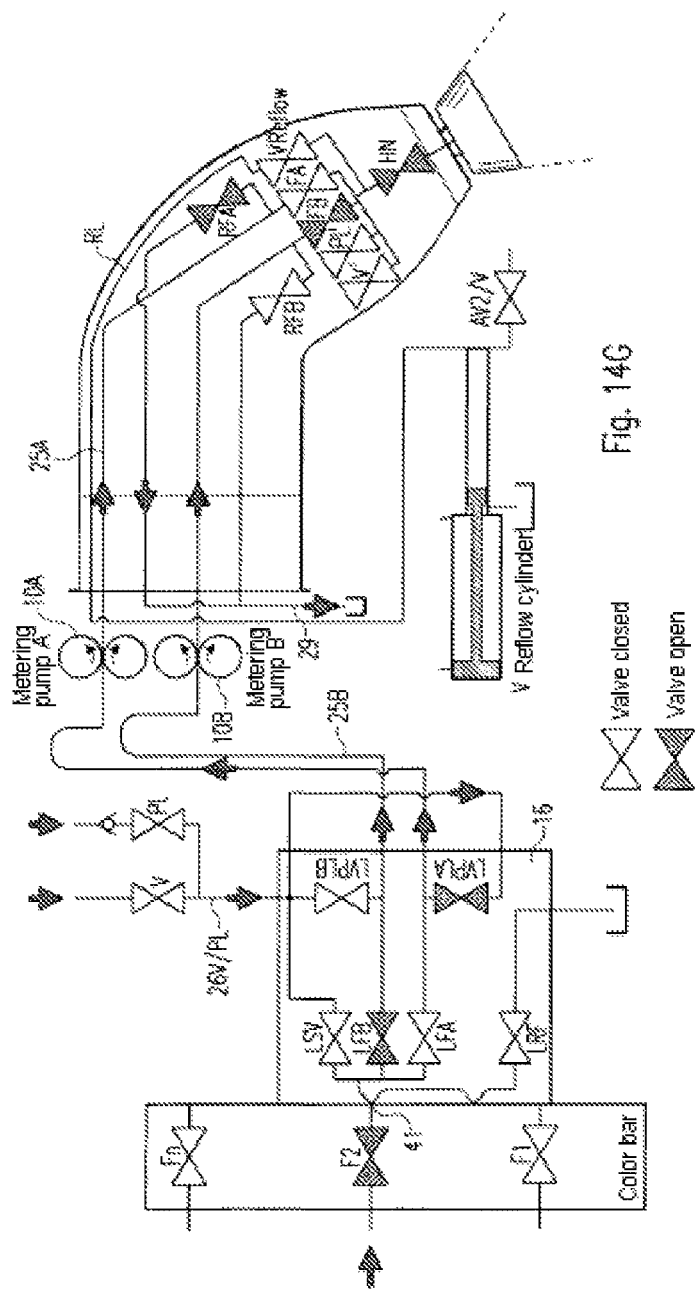

In the operating state shown in FIG. 14G, painting takes place using the new color conveyed from the color valve F2 through the B-branch, i.e. the line 25B, into the bell cup. In parallel therewith and at the same time, the flushing of the A-branch as shown in FIG. 14F can be continued and then ended.

Figure 14H:
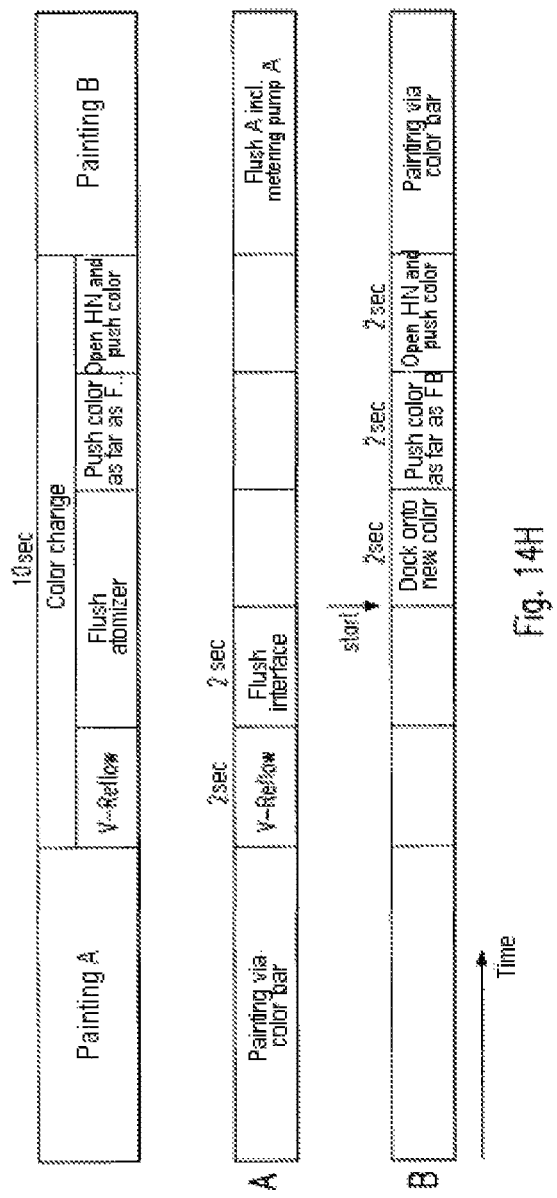

FIG. 14H shows a typical example of the temporal sequence of the described reflow A/B mode. At "start", the docking movement of the docking carriage 16 described with reference to FIG. 14E begins until the inlet 41 is connected to the color valve F2. As can be seen from this figure, the color change time in this example is approximately 10 seconds.

Figure 15:
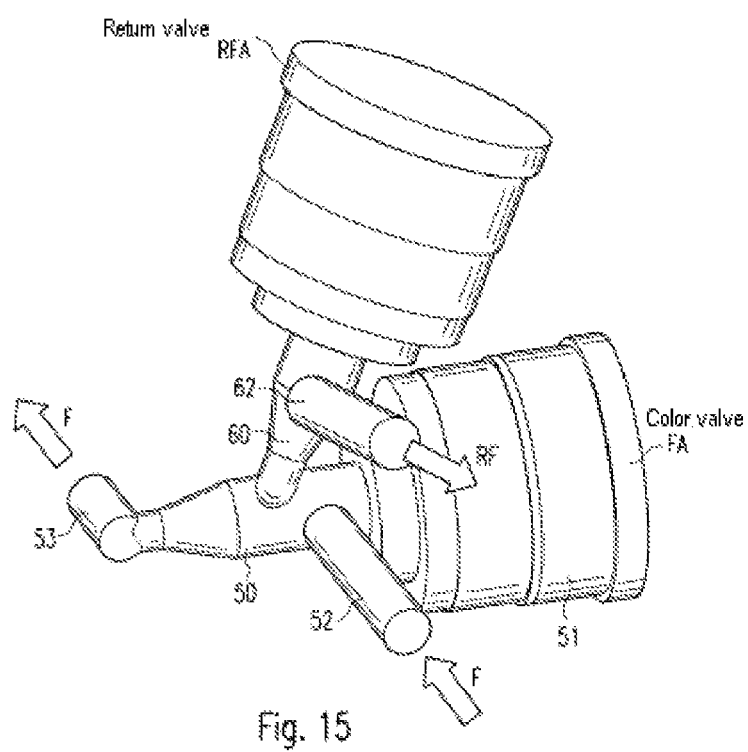
FIG. 15 shows a valve arrangement which is suitable in particular for the A/B systems according to an exemplary illustration.

If the atomizer 7 is to be flushed through the open return valve RFA, e.g. with the color valve FA closed (FIG. 13G and FIG. 14E), the closed color valve should to the greatest possible extent also be flushed as far as its valve seat. The exemplary structural unit shown schematically in FIG. 15 and consisting of the color valve FA and the return valve RFA is suitable for this. In this example, both valves are designed as automatically controlled needle valves of a type generally known per se from painting installations (which may also be suitable for the other valve functions shown in the various drawings, usually with the exception of HN). As is known, such valves may have a tubular housing part 50 with a cylindrical/conical interior, through which the valve needle (not shown) extends as far as the valve seat formed in the outer end of the housing part 50, said valve needle being displaceable by means of an e.g. pneumatic and pneumatically controlled drive in the adjoining housing part 51. The line 52, through which the color F to be controlled is conveyed into the color valve FA under consideration in the illustrated example, is connected to the interior of the housing part 50 at a point located axially opposite said valve seat. In the open state of the valve FA, the color flows on the other side of the valve seat into the outlet line 53.

The return valve RFA may correspond in design terms to the color valve FA, i.e. may have its valve seat in the end of its tubular housing part 60 and the connection line 62 opposite thereto. According to the drawing and the exemplary illustrations, however, the end of the housing part 60, which is conical in this example, opens on the other side of its valve seat into the corresponding housing part 50 of the color valve FA so that, when the return valve RFA is open, the two connection lines 52 and 62 are connected to one another by the physically adjoining interiors of the two valves. Therefore, when the color valve FA is closed and the return valve RFA is opened, firstly residual paint and then the flushing agent can flow through the connection line 52 into the interior of the valve FA in order to flush the illustrated valve unit and from there can flow off through the return valve RFA and the line 62 thereof, as shown by the arrow RF.

A similar valve arrangement may advantageously be provided for the valves RFB and FB of the B-branch of the above-described A/B systems. Instead of the special valve unit shown schematically in FIG. 15, constructions or arrangements are also conceivable in which the valve seat of the return valve is not located in or on the interior of the color valve but rather outside the latter and is connected to the color valve via a suitable line. Furthermore, other known types of valve can be selected both for the above examples of embodiments and also for the examples of embodiments described below, provided that they are suitable for the described purpose.

As has already been mentioned above (in relation to FIG. 5), the color valves 14 may be inserted in the side face of the color bar located opposite the docking points in at least two rows arranged one above the other and parallel to one another in the longitudinal direction of the color bar 12, so that the overall length of the color bar 12 is accordingly reduced. One advantageous example of this arrangement is shown in partially simplified form in FIG. 16, where it is also possible to see on the upper side of the color bar 12 the plug-in nipples 22 likewise already mentioned (in relation to FIGS. 7 and 8) which serve as a color connection for a respective color valve. As shown in the drawing, the plug-in nipples 22 are inserted into the end faces 65 on the upper side of the color bar 12, said end faces being angled in the manner of a roof and being visible also in FIG. 4, so that their axes perpendicular to the angled end faces 65 are likewise inclined at an angle relative to the longitudinal direction of the color bar 12 and for example the clamping screws 24 (FIGS. 7 and 8) can be inserted into the respectively adjacent, oppositely angled end faces. The plug-in nipples 22 may also be arranged respectively next to one another in two rows parallel to the longitudinal direction, of which only the front row of plug-in nipples in the drawing can be seen in FIG. 16. In the region of the side face 66 of the color bar 12 which adjoins the underside of the color bar opposite the paint connections, the first row of color valves 14 extends parallel to the longitudinal direction of the color bar as shown in the drawing. The second row of color valves 14' is inserted in the adjoining region of the side face 66 in the direction of the paint connections, wherein the valves 14 and 14' are offset relative to one another in the longitudinal direction according to the drawing. As a result, the bores of the two rows which are generally necessary for inserting the color valves may be at a smaller vertical distance from one another in the direction vertical to the longitudinal direction, so that a particularly compact structure and small height of the color bar 12 is obtained, as may be desirable and advantageous according to the exemplary illustrations to provide a robot arm that is as flat as possible for the reasons mentioned above.

Since the number of connectable colors and thus of the required color valves 14 and 14' may differ from case to case, but in each case components of the color changer which are as uniform as possible should be used, the color bar 12 may have a modular structure which can be extended or reduced in size in a desired and simple manner with regard to the connectable colors. In the example shown in FIG. 16, the color bar 12 consists of a desired number (here 9) of securely but detachably assembled modules of the type shown schematically for illustration purposes in FIG. 17. As can be seen therefrom, each module 67 contains two color valves 14 and 14', the central axes of which are at a vertical distance A, i.e. measured perpendicular to the longitudinal direction of the color bar 12 (and consequently to the direction of displacement of the docking carriage 16), and have a valve offset VV measured parallel to the longitudinal direction, wherein A is smaller than the actual mutual spacing between the valve axes and in the illustrated example is only slightly larger than the diameter of the valve bore in the plane of the end face 66, while VV may be approximately the same as or, as shown in the drawing, somewhat larger than half the diameter of the valve bore. One of the two plug-in color connection nipples 22 of the module 67 can be seen on the aforementioned angled end face 65.

So that the horizontal length of the color bar 12, i.e. the length measured in its longitudinal direction, is not increased by the horizontally offset arrangement of the color valves, each module 67 has the illustrated curved profile of its transverse faces 68 and 69 extending generally perpendicularly to the side face 66. Accordingly, the transverse face 68 on one side of the module runs from the angled end face 65 initially vertically along the upper color valve 14', in order then to curve inward, approximately following the circular shape thereof, until it comes into the vicinity of the lower color valve 14, along which it then runs vertically again as far as the underside of the color bar 12. The transverse face 69 has a curve profile parallel to this, so that the transverse faces 68 and 69 of adjacent modules 67 precisely fit onto and into one another, as can be seen in FIG. 16. The described shape of the modules 67 has the advantage that, despite the horizontal valve offset VV in the longitudinal direction of the color bar 12, they take up no more space than a module which contains just one single color valve 14. Within the overall length of the color bar 12, the individual modules are wider than the diameter of a valve bore on the outside of the color bar only by the necessary wall thickness of the module body.

FIG. 18 shows the rear side of the modular color bar 12 of FIG. 16, i.e. the docking side thereof with the openings of the docking points 15 and 15' arranged in two rows. These openings have the same axis as the needle axes or central axes of the associated color valves 14 and 14' and are thus likewise offset from one another by the values A and VV (FIG. 17). Furthermore, it can be seen that in each row of color valves and docking points 15 and 15' the mutual spacing between the axes of adjacent valves or docking points may in each case be equal to twice the valve offset VV. In other words, in each case one color valve of one row is located in the middle between two color valves of the other row in the longitudinal direction of the color bar 12. Also shown is the row of docking points 71 for the control air of the color valves, which is parallel to the rows of docking points 15 and 15' and which is located in this example between the upper docking points 15' and the upper side of the color bar. As has already been described, each color valve 14 and 14' has its own docking position for the docking carriage 16, which is in each case defined by one of the positioning and centering bushings 70 for the centering pins (not shown) mentioned above, said bushings being shown at the lower edge of the color bar 12. For the sake of simplification, the guide construction (groove 18 in FIGS. 4 and 6) for the docking carriage is omitted in FIG. 18.

Also shown in FIG. 18 are holding parts 72 and 73 at both ends of the color bar 12 which serve for holding and fixing the color bar in the robot arm 5 (FIGS. 1-3) and for this purpose are releasably attached to a respective end module 67. According to the drawing, the holding parts 72 and 73 have end faces 74 and 75 which face toward the end modules and have the curve shape of one or the other transverse faces 68 or 69 of the modules 67, so that the transverse faces of the latter fit precisely onto and into the relevant end faces 74 and 75 of the holding parts.

Figure 19:
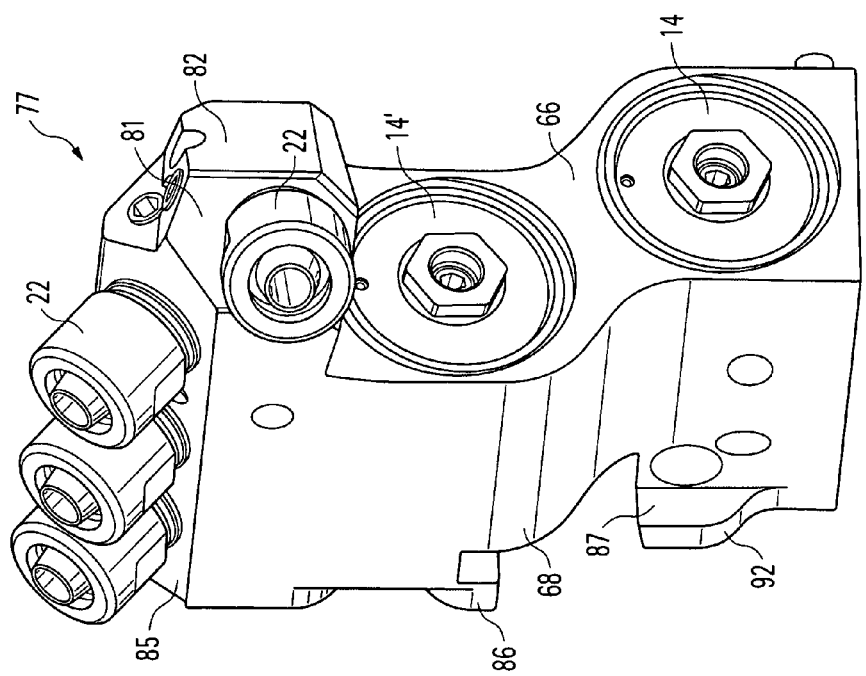
FIG. 19 shows a view of one module of the color bar of FIG. 16 which operates with color circulation, according to an exemplary illustration.

In the example shown in FIGS. 16-18, the color lines 13 (FIG. 1) may lead via a respective plug-in connecting nipple 22 in each case as a stub line to the associated color valve 14 or 14'. In other cases, on the other hand, a constant circulation of color should take place from the color source (usually via annular lines) to the relevant valve, for example directly to the valve seat thereof, and from there via an additional line back to the color source, in order to avoid any possible separation of the individual color components which may be possible under some circumstances in stub lines. To this end, each module of the color bar 12 requires twice the number of color connections, i.e. four instead of two plug-in nipples 22 in the example shown in FIGS. 16-18 for two colors. One example of embodiment of a particularly compact and space-saving module 77 of the color bar 12 for two colors and color circulation is shown in FIG. 19. The arrangement of the two color valves 14 and 14' and the curve shape of the transverse face 68 may correspond to the module 67 described above. By contrast, according to the drawing, three plug-in nipples 22 are arranged next to one another as three of the four necessary connections for respective color lines on the upper angled end face 85 in the drawing, which corresponds to the end face 65 of the module 67, while the necessary fourth plug-in nipple is placed for space reasons in the vicinity of a different location where it neither hinders the described well-fitting assembly of the modules nor increases the height and length of the color bar 12. One location suitable for this purpose, for example, is a face 81 of a shoulder 82 which protrudes from the side face 66 above the upper color valve 14' in the drawing transversely to the longitudinal direction of the color bar 12, which face 81 for example adjoins at an angle the transverse face 68 as shown in FIG. 19. The fourth plug-in nipple 22 inserted in the face 81 therefore projects laterally outward at an angle from a corner of the module body in this exemplary illustration.

Figure 20:
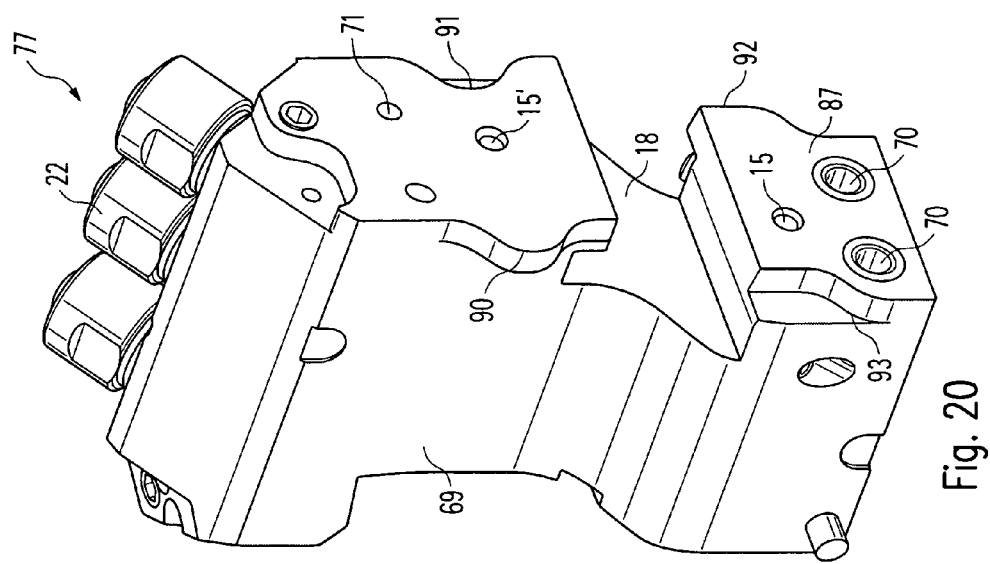
FIG. 20 shows the rear side of the exemplary module of FIG. 19.

FIG. 20 shows a rear side or docking side of the module according to FIG. 19 and the guide construction corresponding for example to FIG. 6B with the groove 18 for the docking carriage 16 (FIG. 5). This guide construction includes the surface elements 86 and 87 which delimit the groove on its two (upper and lower) sides and which contain the described openings of the color docking points 15 and of the control air docking points 71 and may be formed in one piece with the module body. According to the drawing, one (upper) surface element 86 has on its edge adjoining the transverse face 69 of the module a flat, round projection 90 which protrudes parallel to the side face of the module and fits precisely into a likewise flat, round recess 91 of the surface element 86 on the opposite edge of said module and thus also into the corresponding recess 91 of an adjacent module fitted onto the transverse face 69. Similarly, the other (lower) surface element 87 may have at its two edges a rounded protruding projection 92 and a matching recess 93, wherein the projections 90 and 92 may be located on opposite edges of the side face of the module 77. This guide construction, which can also be seen on the rear side of the diagram in FIG. 19, may improve the precision with which adjacent modules fit together.

One advantageous and space-saving valve arrangement of a module for two colors, which allows the desired color circulation as far as the respective valve seat and thus as far as the docking point in the described example of embodiment, is shown partially schematically and in simplified form in FIG. 21. The two color valves 14 and 14' may be the needle valves of the conventional type already described in relation to FIG. 15 which are used in the module shown in FIG. 19. A first forward flow pipe 113 leads from a connecting nipple 122, to which an external feed line (one of the lines 13 in FIG. 1) for a first color is connected, into the tubular housing part 114 of the first color valve 14, which contains the valve seat. From the housing part 114, a backward flow pipe 115 then leads to a second connecting nipple 123, to which an external return line (which may likewise be one of the lines 13 in FIG. 1) for the first color is connected. Via corresponding forward and backward flow pipes 113' and 115', the tubular housing part 114' of the second color valve 114' of the module under consideration may also be connected to corresponding connecting nipples 122' and 123' for the second color. The connecting nipples 122, 122', 123 and 123' may be the four plug-in nipples 22 shown in FIG. 19. For the drive control of the color valves 14 and 14', a respective further pipe 117 or 117' for the respective control air for switching the valve is connected to the widened housing part 116 or 116' thereof. The control air can be supplied through the aforementioned docking points 71 (FIGS. 18 and 20). The spatial arrangement of the color valves and of the various connections for color and control air may correspond to the module shown in FIGS. 19 and 20. The described pipes may advantageously be embodied by generally simple and substantially straight (angled relative to one another where necessary) bores within the module body and/or pipe elements inserted in these bores. The module body may be made in one piece for example from metal or another suitable material. Instead of the straight bores shown in the drawing, curved guide paths may also be provided if desired, wherein the module body may be produced for example by a generative or so-called rapid prototyping method, e.g., as described in DE 10 2008 047 118.6, or by a similar known generative method, which is also suitable for metal bodies.

Instead of the example of a module 67 for two colors, both modules for just one color and also modules for three or more colors with as many color valves with or without color circulation may be provided for the color bar of the described docking color changer. By way of example, a module for four or six colors would simply have the shape of two or respectively three adjacent modules 67 or 77 (FIGS. 16-20). By contrast, a module for three or five colors for example would differ from the modules 67 and 77 by a different arrangement of the paint connection nipples and also by the fact that the curves of the two transverse faces of the module (corresponding to 68 and 69) would not run parallel to one another but rather would run in the form of a mirror image relative to one another, and the side face of the modules would therefore have a wider and a narrower region compared to modules for an even number of color valves.

Figure 22:
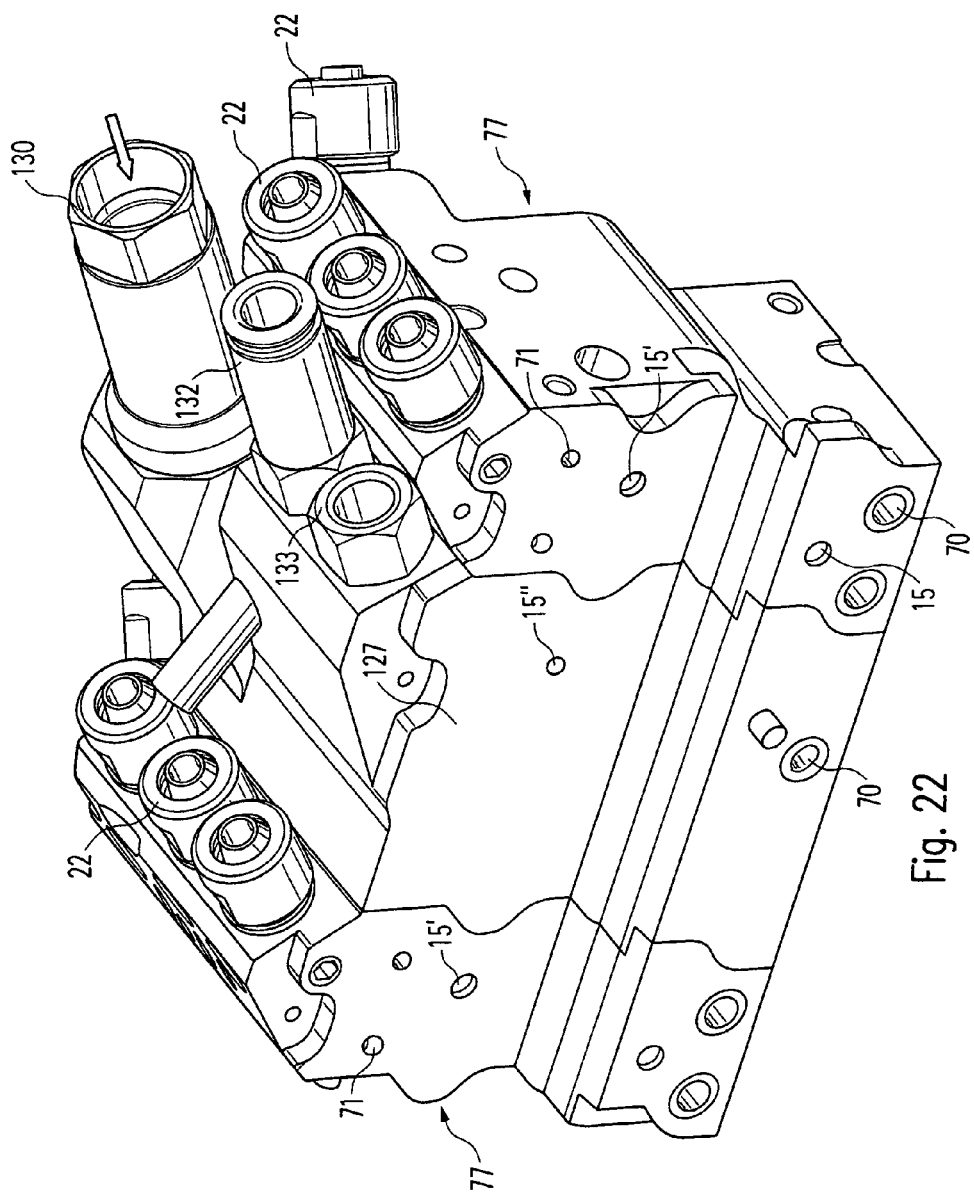
FIG. 22 shows a module for a special color supply which is suitable for adding to a color bar as shown in FIGS. 16-18, according to an exemplary illustration.

In so far as it has been described until now, the docking color changer may be used in particular for frequently required standard colors from the annular lines customary in painting installations of the type under consideration here. However, it can be extended in a simple manner also to the connection of, for example, rarely required special colors, for example by adding at least one special module for special colors as shown in FIG. 22. This module for special colors, which is denoted by 127, is seated here by way of example between two modules 77 of the type described above and shown in FIGS. 19 and 20, with which it coincides with regard to the curve shape of its transverse faces (corresponding to 68 and 69) and its surface elements (corresponding to 86 and 87) with the described projections and recesses (corresponding to 90-93), so that it fits precisely onto and into the transverse faces of the modules 77. On the docking side of the module 127 which can be seen in FIG. 22, there is located in the row of upper docking points 15' a docking point 15" onto which the inlet of the docking carriage 16 intended for this row can dock, as will be described below (FIG. 23A).

The special color supply may generally be intended to take place through one or more color tubes which are pigged in any manner that is convenient, through which the colored paint is conveyed by pigs which can in turn be driven by a pushing means such as compressed air or thinning fluid (e.g., as described in EP 1362641 B1, EP 1362642 B1, etc.). The pigging tube (not shown in FIG. 22) is connected at the illustrated arrow to, for example, a cylindrical connection body 130 which may be constructed as a pigging station. Arranged next to the connection body 130 is a further e.g. tubular connection body 132 for compressed air, which may contain a non-return valve (RV in FIG. 23A). Moreover, a further connection body 133 for a return line (136 in FIG. 23A) is seated next to the connection body 132. As shown in the drawing, the three connection bodies 130, 132 and 133 may be inserted next to one another, in a manner similar to the connecting nipples 22 of the standard color modules 77, into an end face 135 of the module 127 which is angled in a roof-like manner, so that the central axes thereof, in a manner similar to the three connecting nipples 22 arranged next to one another, are inclined in planes parallel to the longitudinal direction of the color bar at an angle relative to this longitudinal direction. As a result, a small connection height is also obtained for the module 127, as is desirable for a flat color changer which is to be used for installation in a robot arm for interior painting.

In the illustrated example, the module 127 is twice as wide in the longitudinal direction of the color bar as the modules 77 for standard colors. A plurality of modules 127 for special colors may also be installed in the illustrated manner in the color bar. Furthermore, a pigging path common to a plurality of special colors may be provided, for example as described in EP 1522348 A2.

In order to explain the mode of operation, the valve scheme of the special color supply is shown in partially simplified form in FIG. 23A. Accordingly, the color bar 12 contains within the above-described module 127 a color valve F, shown as a directional control valve, which controllably connects the pigging tube 135, which is connected to the connection body 130 (FIG. 22), to the docking point 15" of the module 127 and to an inlet of the return valve RF, to the outlet of which the return line 136 is connected via the aforementioned connection body 133. Also connected to the inlet of the return valve RF is the outlet of a compressed air valve PLM, the inlet of which is connected to a compressed air line 137 via the non-return valve RV in the aforementioned connection body 132. As in the examples of embodiments described further above, F1 and Fn denote the color valves for standard colors provided in the color bar 12.

FIG. 23B is a somewhat more detailed illustration of the valve arrangement within the module 127.

During operation, firstly the special color may be supplied from the pigging tube 135 through the color valve F, which is open in the direction of the return valve RF, and through the initially likewise open return valve RF into the return line 136, so that the special color can then be supplied without air to the docking point 15". When the special color reaches the return line 136, which is reported by a paint sensor ZFS, the valve RF can be closed and the color valve F can be opened toward the docking point 15" and the docked inlet 40 of the docking carriage 16. The special color can flow for example into the docking carriage 16, until the pig conveying the special color through the pigging tube 135 reaches the connection body 130. However, a mode of operation is also possible in which the color is then further conveyed past the pig, e.g., in any known manner that is convenient. In any case, after the end of the application process, the pig can be pushed back through the pigging tube 135 and in the process can push the color residue located therein back to the color source, so that no paint losses are obtained also for the special color. The pig can be pushed back by the compressed air introduced through the valve PLM with the valve RF closed and the docking point blocked.

Thinner and/or compressed air from the docking carriage may be used to flush the valve arrangement of the module 127 (possibly also to push back the pig). Another possibility which is advantageous at present lies in conveying a flushing agent, such as e g thinning fluid, through the pigging tube 135 into the module 127, from where it can flow off through the return line 136. Furthermore, pulsed air may also be supplied through the valve PLM in order to flush the valve arrangement.

The valve arrangement on the atomizer side of the color changer may correspond to an example of embodiment described above for the standard colors, for example the arrangement described with reference to FIG. 9A, etc., wherein the valves LRF, LF, LSV, LVPL and LPO are functionally identical to the valves RF2, FGV/F, V/PL, V1/PL and V/PO in FIG. 13. The same applies to the valves V, PL, HN and RF1. As can be seen, the valve arrangement on the atomizer side in FIG. 23A substantially also corresponds to the arrangement described with reference to FIG. 13A, etc. when it is reduced to just one color line 25 instead of the A/B system shown in FIG. 13, although the latter can likewise be used here.

The exemplary illustrations include different aspects, such as for example the color changer, the new type of connection structure for the color lines, the "push-out mode" and the "reflow mode", optionally with the described A/B systems, which may also be suitable for different types of docking color changers, including those with rotatable docking parts, and the separate flushing circuits. The same applies to the exemplary valve arrangement which was described with reference to FIG. 15 and which may also be advantageous for other purposes in a painting installation. It must therefore be mentioned that the individual aspects of the exemplary illustrations are notable independently of one another.

One aspect which is also worthy of protection must also be seen in particular in using for the interior painting of bodies a painting robot which is mounted at a raised height, for example in a stationary position or on a displacement rail as described in EP 1 609 532 A1, as has already been mentioned above. For example, the pivot axis of its distal arm ("axis 3") during painting may be located in the vertical direction below the pivot axis of the upper arm ("axis 2"), known as "arm 1", which is in the vertical axis of rotation ("axis 1") of the robot (known per se as "elbow down"). In this position, during interior painting, the distal arm can be introduced e.g. at least approximately horizontally into the interior spaces of the body better than in the position customary until now in which the "axis 3" was above the "axis 2" in the vertical direction, so that the risk of collisions can be avoided even when the application technology including the color changer and possibly metering pumps, paint pressure regulators, etc. are installed on or in the distal arm. As already mentioned in the introduction, one advantageous installation of the application technology in the "arm 2", according to the exemplary illustrations, has the important advantage of reduced color change losses. In this case, it may be advantageous if the pivot axis bearing of the upper arm ("axis 2") is not located conventionally above the robot base but rather vertically below the robot base, so as to obtain correspondingly reversed kinematics. For the painting of other, in particular outer faces of the body, the robot arms can also be pivoted into the reverse position, in which the "axis 3" is located above the "axis 2". The "axis 2" may be located below the displacement rail of the robot.

The exemplary illustrations are not limited to the specific examples illustrated above. Rather, a plurality of variations and alterations are possible that also make use of the ideas described herein, and therefore fall within the scope of protection. Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A painting robot adapted for painting motor vehicle bodies having outer faces to be painted on the outside of the motor vehicle bodies and inner faces to be painted in the interior of the motor vehicle bodies by an atomizer guided by the painting robot, wherein the painting robot is adapted both for painting the outer faces and for painting the inner faces of the motor vehicle bodies, the painting robot comprising:
 at least one robot arm configured to spatially position the atomizer, the at least one robot arm including a distal arm; and
 a color changer mounted on the distal arm, the color changer including:
  a plurality of color feed lines on an inlet side;
  a common color line on an outlet side configured to forward paint selected by the color changer to the atomizer;
  a color bar comprising a plurality of docking points supplied by the color feed lines, and
  a color extractor configured to selectively dock onto one of the docking points of the color bar and, while docked to the color bar, extract paint from an associated color feed line and supply the extracted paint to the common color line.

2. The painting robot according to claim 1, wherein
the motor vehicle bodies to be painted have body openings, and
the distal robot arm has a width in a direction measured transversely to its longitudinal axis that allows the atomizer to be positioned in the interior of the motor vehicle bodies through the body openings.

3. The painting robot according to claim 1,
wherein a) there is arranged in each of the color feed lines a color control device which selectively blocks or enables the respective color feed line, b) the respective color control device is controlled by a control signal that includes control air supplied by additional docking points onto which the color extractor can dock, and c) the control signal is passed from the color extractor via an associated additional docking point to the respective color control device, so that the control signal reaches the respective color control device only when the color extractor is docked onto the associated additional docking point.

4. The painting robot according to claim 1, wherein the color extractor can be moved relative to the docking points of the color bar.

5. The painting robot according to claim 1, wherein
a control loop is provided for positioning the color extractor in relation to the docking points of the color bar,
which control loop contains a measuring device measuring the position of the color extractor in relation to the docking points and compares the measured values with stored nominal position values in order to bring the measured positions into correspondence with the nominal values,
and wherein at least one centering element is arranged at least on one of the color extractor or the docking points, said at least one centering element engaging in a receiving opening of the other of the color extractor or the docking points during a docking process.

6. The painting robot according to claim 1, wherein a drive, which can be controlled by stored control data, is provided for relative movement between the color extractor and the docking points of the color changer.

7. The painting robot according to claim 1, further comprising:
 a) a first flushing circuit for flushing the docking points of the color changer with a flushing agent, and
 b) a second flushing circuit for flushing the common color line between the color changer and the atomizer with a flushing agent, wherein the first flushing circuit is separate from the second flushing circuit so that the docking points can be flushed independently of and separately from the common color line.

8. The painting robot according to claim 7,
wherein a) a separating valve is arranged in the common color line in the color extractor in order to separate the first and second flushing circuits from one another,
 b) the first flushing circuit leads from a first flushing agent feed line via a first flushing agent valve into the common color line upstream of the separating valve to the docking points through a first return valve into a first return line,
 c) the second flushing circuit leads from a second flushing agent feed line via a second flushing agent valve through the common color line downstream of the separating valve to the atomizer via a second return valve into a second return line or a main needle valve of the atomizer.

9. The painting robot according to claim 1, wherein a flushing agent feed line opens into the common color line upstream of a main needle valve of the atomizer via a first flushing agent valve arranged in the atomizer to push the paint remaining in the common color line back through the color changer into the associated color feed line for later reuse.

10. The painting robot according to claim 9, further comprising: a) a flushing agent metering means which is arranged in the flushing agent feed line upstream of the first flushing agent valve and which can push the flushing agent located in the flushing agent metering means into the common color line when the first flushing agent valve is opened, and b) a second flushing agent valve for controllably filling the flushing agent metering means via the flushing agent feed line.

11. The painting robot according to claim 10, wherein a) the flushing agent metering means has a metering volume which is substantially identical to a filling volume of the common color line between a respective docking point and the main needle valve of the atomizer.

12. The painting robot according to claim 1, further comprising a clamping device for mechanically clamping the color extractor and a respective docking point in the docked state.

13. The painting robot according to claim 12, wherein the clamping device comprises a groove with an undercut, onto which a movable clamping element latches.

14. The painting robot according to claim 13, wherein the groove has the undercut only on an upper groove flank, and does not have the undercut on a lower groove flank.

15. The painting robot according to claim 1, further comprising
   a) a paint pressure regulator which is mounted in or on the distal robot arm, and
   b) a metering pump which is mounted in or on the distal robot arm for metering the paint to be applied, wherein the metering pump is connected on the outlet side to the color changer and on an inlet side to the atomizer, and
   c) an actuator for moving the color extractor relative to the docking points, wherein the actuator is arranged in the distal robot arm.

16. The painting robot according to claim 1, further comprising a common connection block, in which a paint pressure regulator, an actuator, and a metering pump are arranged.

17. The painting robot according to claim 1, wherein the color feed lines are connected to the color changer by a color connection, wherein the color connection includes:
   a) a receiving bore in the color changer for the insertion of the associated color feed line,
   b) an angled clamping surface at an end of the associated color feed line,
   c) a clamping bore which runs in the color changer substantially at a right angle to the receiving bore and opens into the receiving bore, wherein the clamping bore has an inner thread,
   d) a free end of a clamping screw which is screwed into the clamping bore and, in a screwed-in state, presses against the clamping surface of the associated color feed line and axially secures and clamps the associated color feed line.

18. The painting robot according to claim 1, wherein two color lines alternately convey different colors to the atomizer and can be flushed alternately, and wherein a movable part of the color changer has first devices for flushing at least one docking inlet and second devices for flushing the two color lines as far as a valve arrangement located in the atomizer and is connected to the first and second devices.

19. The painting robot according to claim 18, further comprising an automatically controllable first valve, which is designed as a needle valve and the needle valve is displaceable in the interior of a first valve housing part, and an automatically controllable second valve which is connected to said first valve; wherein a controlled inlet or outlet of the second valve is arranged in the interior of the first valve housing part or is connected to the interior of the first valve housing part via a line.

20. The painting robot according to claim 1, further comprising: a paint pressure regulator and a metering pump, wherein the paint pressure regulator and the metering pump are integrated without any connecting tube in a common connection block, wherein the paint pressure regulator is installed directly on the metering pump.

21. The painting robot according to claim 1, further comprising: a docking carriage in the color changer which is displaceable relative to the color bar, wherein the color bar is formed by a plurality of modules releasably attached to one another, each of the modules contains at least one color valve and at least one docking point connected to the at least one color valve.

22. The painting robot according to claim 21, wherein each of the modules contains at least two color valves which are inserted with respective central axes transversely or perpendicularly in a side face of the color bar which is parallel to the longitudinal direction of the color bar,
   wherein the central axes of the color valves of the module are offset relative to one another in the longitudinal direction of the color bar by a certain value and are spaced apart in the direction vertical to the longitudinal direction by a certain value, and these values are identical within at least one of the modules, and
   wherein the docking points are located on the side of the color bar opposite to said side face and are offset relative to one another and spaced apart from one another by the same values as the central axes of the color valves.

23. The painting robot according to claim 22,
   wherein each of the modules has transverse faces with a curved profile which extend transversely to the side face from an upper side of the color bar to an underside of the color bar, the transverse faces adjacent the modules adjoin one another, and wherein the transverse faces, proceeding from the upper side and from the underside, run transversely or perpendicularly relative to the upper side and the underside, bend in a direction parallel to the longitudinal direction of the color bar, and run again transversely or perpendicularly to the upper side and the underside, wherein the transverse faces of each of the modules run parallel to one another or as a mirror image relative to one another.

24. The painting robot according to claim 21,
   wherein at least one connection element, which can be connected to an external color line and has a central axis, is inserted with the central axis perpendicularly to an end face inclined at an angle to the longitudinal direction of the color bar on an upper side of each of the modules and is connected to a corresponding color valve in the interior of each of the modules.

25. The painting robot according to claim 21,
   wherein each of the modules has for the at least one color valve contained in the respective module two connection elements which can be connected to external lines and which are connected inside the modules to the interior of the at least one color valve for the purpose of color circulation.

26. The painting robot according to claim 25,
   wherein the at least one color valves is designed as a needle valves with a tubular housing part containing the valve seat and an additional housing part containing a drive part for the needle valve, and wherein at least one of bores, hollow lines, and pipes in a one-piece module body lead from the connection elements to the tubular housing part of a corresponding color valve for the purpose of paint circulation as far as the valve seat.

27. The painting robot according to claim 26, wherein a further bore or pipe running in a substantially rectilinear manner for compressed air or another control medium for actuating the color valve leads in the module body from a respective docking point of the module to the housing part containing the drive part in each of the at least one color valve of the modules or into the tubular housing part.

28. The painting robot according to claim 21,
   wherein at least one module is insertable into the color bar, the at least one docking point of the at least one module is among a row of docking points of the respective modules adjacent to each other and parallel to the longitudinal direction of the color bar and is connected in the interior of the at least one module via a corresponding color valve to a connection body of the at least one module, to which there is connected a pigging tube for a pig which conveys the color material to the at least one module.

29. The painting robot according to claim 28,
wherein, next to the connection body of the pigging tube, there is at least one additional connection body for a return line and for a line for supplying a pushing medium for pushing the pig back through the pigging tube, and wherein the at least one module contains a respective valve for the return line and for the line for supplying the pushing medium.

30. The painting robot of claim 1, wherein the color extractor and the docking points can be displaced relative to one another.

* * * * *